United States Patent
Lal et al.

(10) Patent No.: US 12,399,840 B2
(45) Date of Patent: *Aug. 26, 2025

(54) TECHNOLOGIES FOR SECURE I/O WITH ACCELERATOR DEVICES

(71) Applicant: Intel Corporation, Santa Clara, CA (US)

(72) Inventors: Reshma Lal, Portland, OR (US); Alpa Narendra Trivedi, Hillsboro, OR (US); Luis Kida, Beaverton, OR (US); Pradeep M. Pappachan, Tualatin, OR (US); Soham Jayesh Desai, Rochester, MN (US); Nanda Kumar Unnikrishnan, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 232 days.

This patent is subject to a terminal disclaimer.

(21) Appl. No.: 17/446,194

(22) Filed: Aug. 27, 2021

(65) Prior Publication Data

US 2021/0390063 A1 Dec. 16, 2021

Related U.S. Application Data

(63) Continuation of application No. 16/232,146, filed on Dec. 26, 2018, now Pat. No. 11,138,132.

(Continued)

(51) Int. Cl.
*G06F 21/00* (2013.01)
*G06F 9/38* (2018.01)
(Continued)

(52) U.S. Cl.
CPC ........ *G06F 12/1408* (2013.01); *G06F 9/3877* (2013.01); *G06F 9/45558* (2013.01);
(Continued)

(58) Field of Classification Search
None
See application file for complete search history.

(56) References Cited

U.S. PATENT DOCUMENTS

| | | | |
|---|---|---|---|
| 7,523,097 B1 | 4/2009 | Wilson et al. | |
| 7,716,389 B1 * | 5/2010 | Bruce | G06F 13/28 710/110 |

(Continued)

FOREIGN PATENT DOCUMENTS

| | | |
|---|---|---|
| CA | 2303297 | 3/1999 |
| CN | 110618947 A | 12/2019 |

(Continued)

OTHER PUBLICATIONS

Advisory Action, U.S. Appl. No. 16/232,143, Jan. 14, 2022, 3 pages.

(Continued)

*Primary Examiner* — Shin-Hon (Eric) Chen
(74) *Attorney, Agent, or Firm* — NICHOLSON DE VOS WEBSTER & ELLIOTT LLP

(57) ABSTRACT

Technologies for secure I/O data transfer with an accelerator device include a computing device having a processor and an accelerator. The processor establishes a trusted execution environment. The trusted execution environment may generate an authentication tag based on a memory-mapped I/O transaction, write the authentication tag to a register of the accelerator, and dispatch the transaction to the accelerator. The accelerator performs a cryptographic operation associated with the transaction, generates an authentication tag based on the transaction, and compares the generated authentication tag to the authentication tag received from the trusted execution environment. The accelerator device may initialize an authentication tag in response to a command from the trusted execution environment, transfer data between host memory and accelerator memory, perform a cryptographic operation in response to transferring the data, (Continued)

and update the authentication tag in response to transferrin the data. Other embodiments are described and claimed.

17 Claims, 8 Drawing Sheets

Related U.S. Application Data

(60) Provisional application No. 62/687,403, filed on Jun. 20, 2018.

(51) Int. Cl.
| | |
|---|---|
| *G06F 9/455* | (2018.01) |
| *G06F 12/0802* | (2016.01) |
| *G06F 12/14* | (2006.01) |
| *G06F 21/57* | (2013.01) |
| *G06F 21/60* | (2013.01) |
| *G06F 21/64* | (2013.01) |
| *G06F 21/76* | (2013.01) |
| *G06F 21/79* | (2013.01) |
| *H04L 9/06* | (2006.01) |
| *H04L 9/08* | (2006.01) |
| *H04L 9/32* | (2006.01) |
| *H04L 41/046* | (2022.01) |
| *H04L 41/28* | (2022.01) |

(52) U.S. Cl.
CPC .......... *G06F 12/0802* (2013.01); *G06F 21/57* (2013.01); *G06F 21/602* (2013.01); *G06F 21/606* (2013.01); *G06F 21/64* (2013.01); *G06F 21/76* (2013.01); *G06F 21/79* (2013.01); *H04L 9/0631* (2013.01); *H04L 9/0637* (2013.01); *H04L 9/083* (2013.01); *H04L 9/0838* (2013.01); *H04L 9/0844* (2013.01); *H04L 9/085* (2013.01); *H04L 9/0891* (2013.01); *H04L 9/321* (2013.01); *H04L 9/3215* (2013.01); *H04L 9/3226* (2013.01); *H04L 9/3268* (2013.01); *H04L 9/3278* (2013.01); *H04L 41/046* (2013.01); *H04L 41/28* (2013.01); *G06F 2009/45591* (2013.01); *G06F 2009/45595* (2013.01)

(56) References Cited

U.S. PATENT DOCUMENTS

| | | | |
|---|---|---|---|
| 9,141,769 B1 | 9/2015 | Hitchcock et al. | |
| 9,215,249 B2 | 12/2015 | Smith | |
| 9,524,399 B1* | 12/2016 | Takahashi | G06F 12/1408 |
| 9,769,123 B2* | 9/2017 | Grewal | G06F 21/52 |
| 9,954,826 B2* | 4/2018 | Buer | H04L 63/0428 |
| 10,057,243 B1 | 8/2018 | Kumar et al. | |
| 10,291,395 B1* | 5/2019 | Nenov | H04L 9/3226 |
| 10,303,645 B2 | 5/2019 | Franke | |
| 10,419,931 B1 | 9/2019 | Sohail et al. | |
| 10,469,265 B2 | 11/2019 | Xing | |
| 10,515,317 B1 | 12/2019 | Kenthapadi et al. | |
| 10,664,179 B2* | 5/2020 | Alexandrovich | G06F 3/0637 |
| 2003/0235310 A1 | 12/2003 | Saito et al. | |
| 2004/0250097 A1 | 12/2004 | Cheung et al. | |
| 2006/0126835 A1 | 6/2006 | Kim et al. | |
| 2008/0209203 A1* | 8/2008 | Haneda | G06F 21/85 |
| | | | 713/150 |
| 2010/0178977 A1 | 7/2010 | Kim et al. | |
| 2011/0280402 A1 | 11/2011 | Ibrahim et al. | |
| 2011/0314282 A1 | 12/2011 | Tanaka et al. | |
| 2013/0254494 A1* | 9/2013 | Oxford | G06F 12/1466 |
| | | | 711/145 |
| 2014/0047174 A1 | 2/2014 | Sakthikumar et al. | |
| 2014/0056307 A1 | 2/2014 | Hutchison et al. | |
| 2014/0177823 A1 | 6/2014 | Gopal et al. | |
| 2014/0281544 A1 | 9/2014 | Paczkowski et al. | |
| 2014/0281587 A1 | 9/2014 | Ignatchenko | |
| 2014/0304649 A1 | 10/2014 | Phegade et al. | |
| 2015/0113241 A1 | 4/2015 | Martin et al. | |
| 2015/0244530 A1 | 8/2015 | Clayton et al. | |
| 2015/0249654 A1 | 9/2015 | Mundra et al. | |
| 2015/0347768 A1 | 12/2015 | Martin et al. | |
| 2016/0119318 A1 | 4/2016 | Zollinger et al. | |
| 2016/0277372 A1* | 9/2016 | Shah | H04L 63/0485 |
| 2016/0352701 A1 | 12/2016 | Vora et al. | |
| 2016/0381005 A1 | 12/2016 | Vij et al. | |
| 2017/0005809 A1 | 1/2017 | Adam et al. | |
| 2017/0006030 A1 | 1/2017 | Krishnamoorthy et al. | |
| 2017/0024568 A1* | 1/2017 | Pappachan | G06F 21/64 |
| 2017/0024569 A1* | 1/2017 | Xing | G06F 13/28 |
| 2017/0024570 A1 | 1/2017 | Pappachan et al. | |
| 2017/0026171 A1* | 1/2017 | Lal | H04L 9/0822 |
| 2017/0093571 A1 | 3/2017 | Satpathy et al. | |
| 2017/0104597 A1 | 4/2017 | Negi et al. | |
| 2017/0171194 A1* | 6/2017 | Durham | H04L 9/3234 |
| 2017/0185514 A1 | 6/2017 | Blinzer et al. | |
| 2018/0062829 A1 | 3/2018 | Suresh et al. | |
| 2018/0084415 A1 | 3/2018 | Babbage | |
| 2018/0107608 A1* | 4/2018 | Kaplan | G06F 12/1466 |
| 2018/0114013 A1* | 4/2018 | Sood | G06F 21/606 |
| 2018/0365406 A1 | 12/2018 | Elnekaveh et al. | |
| 2018/0365424 A1* | 12/2018 | Callaghan | G06F 21/575 |
| 2019/0013965 A1 | 1/2019 | Sindhu et al. | |
| 2019/0044724 A1 | 2/2019 | Sood et al. | |
| 2019/0081776 A1* | 3/2019 | Satou | H04L 9/0841 |
| 2019/0132136 A1 | 5/2019 | Scarlata et al. | |
| 2019/0319785 A1* | 10/2019 | Kumar | H04L 9/14 |
| 2020/0159657 A1* | 5/2020 | Kida | G06F 12/1408 |
| 2021/0081577 A1 | 3/2021 | Zhang et al. | |
| 2021/0119780 A1* | 4/2021 | Hassan | H04L 9/088 |
| 2022/0214973 A1* | 7/2022 | Richardson | G06F 12/0808 |

FOREIGN PATENT DOCUMENTS

| | | |
|---|---|---|
| DE | 102019113352 A1 | 12/2019 |
| WO | 2013/081441 A1 | 6/2013 |

OTHER PUBLICATIONS

Advisory Action, U.S. Appl. No. 16/234,726, Dec. 1, 2022, 3 pages.
Advisory Action, U.S. Appl. No. 16/234,726, Sep. 20, 2021, 3 pages.
Advisory Action, U.S. Appl. No. 16/236,074, Jul. 25, 2022, 2 pages.
Final Office Action, U.S. Appl. No. 16/232,143, Oct. 25, 2021, 51 pages.
Final Office Action, U.S. Appl. No. 16/234,726, Jul. 20, 2022, 19 pages.
Final Office Action, U.S. Appl. No. 16/234,726, Jun. 8, 2021, 17 pages.
Final Office Action, U.S. Appl. No. 16/236,074, May 10, 2022, 18 pages.
Final Office Action, U.S. App. No. 17/496, 147, Mar. 21, 2023, 13 pages.
Final Office Action, U.S. Appl. No. 17/543,267, Jan. 11, 2024, 6 pages.
Final Office Action, U.S. Appl. No. 18/060,702, Mar. 21, 2024, 12 pages.
Hu et al., "Certificate Revocation Guard (CRG): An Efficient Mechanism for Checking Certificate Revocation," 2016 IEEE 41st Conference on Local Computer Networks (LCN), Dubai, 2016, pp. 527-530.
Non-Final Office Action, U.S. Appl. No. 16/232,139, Jan. 14, 2021, 15 pages.
Non-Final Office Action, U.S. Appl. No. 16/232,143, Jan. 15, 2021, 43 pages.
Non-Final Office Action, U.S. Appl. No. 16/232,143, Jul. 8, 2021, 48 pages.
Non-Final Office Action, U.S. Appl. No. 16/234,726, Dec. 16, 2021, 22 pages.

(56) References Cited

OTHER PUBLICATIONS

Non-Final Office Action, U.S. Appl. No. 16/234,726, Jan. 13, 2021, 16 pages.
Non-Final Office Action, U.S. Appl. No. 16/236,074, Dec. 10, 2021, 15 pages.
Non-Final Office Action, U.S. Appl. No. 16/444,053, Dec. 9, 2021, 12 pages.
Non-Final Office Action, U.S. Appl. No. 17/496,147, Nov. 10, 2022, 12 pages.
Non-Final Office Action, U.S. Appl. No. 17/543,267, Mar. 30, 2023, 17 pages.
Non-Final Office Action, U.S. Appl. No. 17/724,743, Nov. 25, 2022, 42 pages.
Non-Final Office Action, U.S. Appl. No. 18/060,702, Sep. 21, 2023, 11 pages.
Notice of Allowance, U.S. lNo. 16/232,139, Jul. 8, 2021, 11 pages.
Notice of Allowance, U.S. Appl. No. 16/232,143, Apr. 26, 2022, 2 pages.
Notice of Allowance, U.S. Appl. No. 16/232,143, Mar. 11, 2022, 22 pages.
Notice of Allowance, U.S. Appl. No. 16/232,146, May 28, 2021, 22 pages.
Notice of Allowance, U.S. Appl. No. 16/234,726, Jan. 19, 2023, 12 pages.
Notice of Allowance, U.S. Appl. No. 16/236,074, Sep. 2, 2022, 12 pages.
Notice of Allowance, U.S. Appl. No. 16/444,053, Apr. 18, 2022, 8 pages.
Notice of Allowance, U.S. Appl. No. 17/724,743, Mar. 21, 2023, 10 pages.
Notice of Allowance, U.S. Appl. No. 17/543,267, May 13, 2024, 8 pages.
Notice of Allowance, U.S. Appl. No. 18/060,702, Aug. 15, 2024, 11 pages.
Restriction Requirement, U.S Appl. No. 16/444,053, Sep. 21, 2021, 7 pages.
Notice of Allowance, U.S. Appl. No. 17/543,267, Sep. 11, 2024, 9 pages.
Notice of Allowance, U.S. Appl. No. 18/060,702, Sep. 5, 2024, 7 pages.

* cited by examiner

TECHNOLOGIES FOR SECURE I/O WITH ACCELERATOR DEVICES

CLAIM TO PRIORITY

This Application is a continuation of and claims the benefit of and priority to U.S. application Ser. No. 16/232,146, entitled TECHNOLOGIES FOR SECURE I/O WITH ACCELERATOR DEVICES, by Reshma Lal, et al., filed Dec. 26, 2019, now allowed, which claims the benefit of and priority to U.S. Provisional Patent Application No. 62/687,403, filed Jun. 20, 2018, the entire contents of which are incorporated herein by reference.

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. Intel® SGX does not protect I/O data that moves across the on-chip boundary.

Modern computing devices may include general-purpose processor cores as well as a variety of hardware accelerators for offloading compute-intensive workloads or performing specialized tasks. Hardware accelerators may include, for example, one or more field-programmable gate arrays (FPGAs), which may include programmable digital logic resources that may be configured by the end user or system integrator. Hardware accelerators may also include one or more application-specific integrated circuits (ASICs). Hardware accelerators may be embodied as I/O devices that communicate with the processor core over an I/O interconnect.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
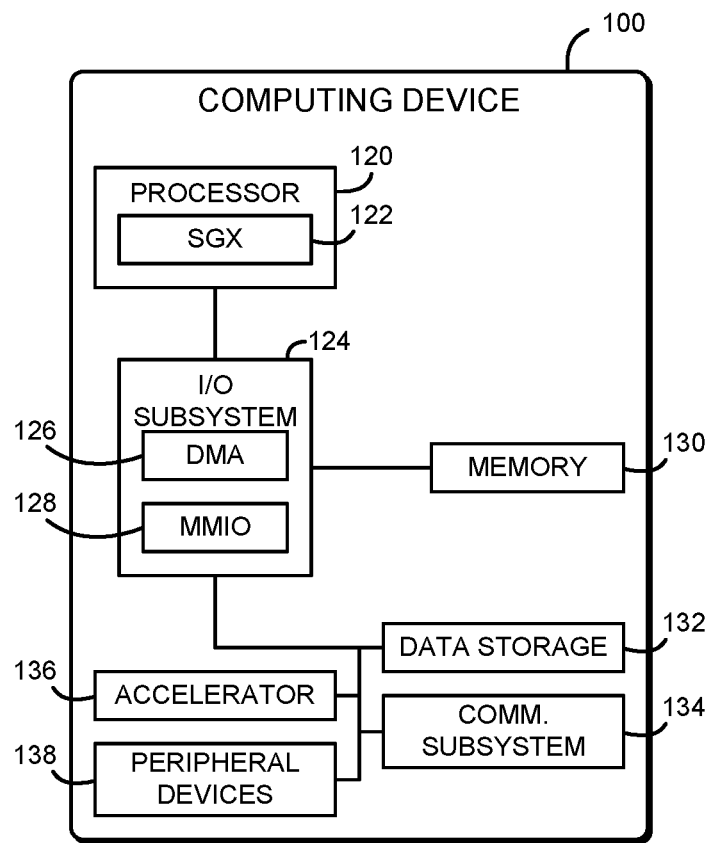
FIG. 1 is a simplified block diagram of at least one embodiment of a computing device for secure I/O with an accelerator device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing device 100 for secure I/O with an accelerator device includes a processor 120 and an accelerator device 136, such as a field-programmable gate array (FPGA). In use, as described further below, a trusted execution environment (TEE) established by the processor 120 securely communicates data with the accelerator 136. Data may be transferred using memory-mapped I/O (MMIO) transactions or direct memory access (DMA) transactions. For example, the TEE may perform an MMIO write transaction that includes encrypted data, and the accelerator 136 decrypts the data and performs the write. As another example, the TEE may perform an MMIO read request transaction, and the accelerator 136 may read the requested data, encrypt the data, and perform an MMIO read response transaction that includes the encrypted data. As yet another example, the TEE may configure the accelerator 136 to perform a DMA operation, and the accelerator 136 performs a memory transfer, performs a cryptographic operation (i.e., encryption or decryption), and forwards the result. As described further below, the TEE and the accelerator 136 generate authentication tags (ATs) for the transferred data and may use those ATs to validate the transactions. The computing device 100 may thus keep untrusted software of the computing device 100, such as the operating system or virtual machine monitor, outside of the trusted code base (TCB) of the TEE and the accelerator 136. Thus, the computing device 100 may secure data exchanged or otherwise processed by a TEE and an accelerator 136 from an owner of the computing device 100 (e.g., a cloud service provider) or other tenants of the computing device 100. Accordingly, the computing device 100 may improve security and performance for multi-tenant environments by allowing secure use of accelerator devices.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 124, a memory 130, and a data storage device 132. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, which allows the processor 120 to establish a trusted execution environment known as a secure enclave, in which executing code may be measured, verified, or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 130. The secure enclave support 122 may be embodied as a set of processor instruction extensions that allows the processor 120 to establish one or more secure enclaves in the memory 130. For example, the secure enclave support 122 may be embodied as Intel® Software Guard Extensions (SGX) technology.

The memory 130 may be embodied as any type of volatile or non-volatile memory or data storage capable of performing the functions described herein. In operation, the memory 130 may store various data and software used during operation of the computing device 100 such as operating systems, applications, programs, libraries, and drivers. As shown, the memory 130 may be communicatively coupled to the processor 120 via the I/O subsystem 124, which may be embodied as circuitry and/or components to facilitate input/output operations with the processor 120, the memory 130, and other components of the computing device 100. For example, the I/O subsystem 124 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 130 may be directly coupled to the processor 120, for example via an integrated memory controller hub. Additionally, in some embodiments, the I/O subsystem 124 may form a portion of a system-on-a-chip (SoC) and be incorporated, along with the processor 120, the memory 130, the accelerator device 136, and/or other components of the computing device 100, on a single integrated circuit chip. Additionally or alternatively, in some embodiments the processor 120 may include an integrated memory controller and a system agent, which may be embodied as a logic block in which data traffic from processor cores and I/O devices converges before being sent to the memory 130.

As shown, the I/O subsystem 124 includes a direct memory access (DMA) engine 126 and a memory-mapped I/O (MMIO) engine 128. The processor 120, including secure enclaves established with the secure enclave support 122, may communicate with the accelerator device 136 with one or more DMA transactions using the DMA engine 126 and/or with one or more MMIO transactions using the MMIO engine 128. The computing device 100 may include multiple DMA engines 126 and/or MMIO engines 128 for handling DMA and MMIO read/write transactions based on bandwidth between the processor 120 and the accelerator 136. Although illustrated as being included in the I/O subsystem 124, it should be understood that in some embodiments the DMA engine 126 and/or the MMIO engine 128 may be included in other components of the computing device 100 (e.g., the processor 120, memory controller, or system agent), or in some embodiments may be embodied as separate components.

The data storage device 132 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 134, which may be embodied as any communication circuit, device, or collection thereof, capable of enabling communications between the computing device 100 and other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The accelerator device 136 may be embodied as a field-programmable gate array (FPGA), an application-specific integrated circuit (ASIC), a coprocessor, or other digital logic device capable of performing accelerated functions (e.g., accelerated application functions, accelerated network functions, or other accelerated functions). Illustratively, the accelerator device 136 is an FPGA, which may be embodied as an integrated circuit including programmable digital logic resources that may be configured after manufacture. The FPGA may include, for example, a configurable array of logic blocks in communication over a configurable data interchange. The accelerator device 136 may be coupled to the processor 120 via a high-speed connection interface such as a peripheral bus (e.g., a PCI Express bus) or an inter-processor interconnect (e.g., an in-die interconnect (IDI) or QuickPath Interconect (QPI)), or via any other appropriate interconnect. The accelerator device 136 may receive data and/or commands for processing from the processor 120 and return results data to the processor 120 via DMA, MMIO, or other data transfer transactions.

As shown, the computing device 100 may further include one or more peripheral devices 138. The peripheral devices 138 may include any number of additional input/output devices, interface devices, hardware accelerators, and/or other peripheral devices. For example, in some embodiments, the peripheral devices 138 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Figure 2:
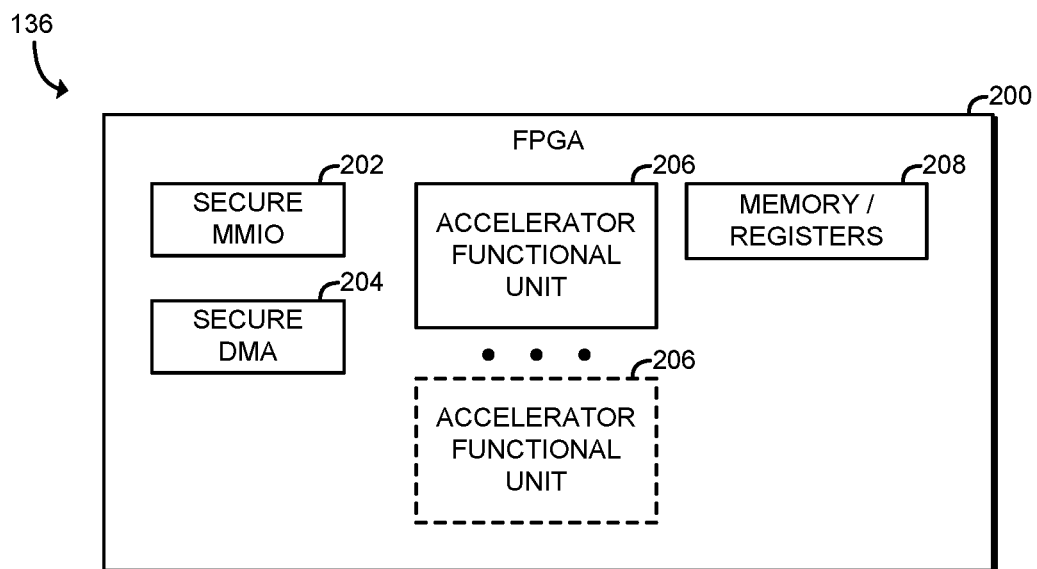
FIG. 2 is a simplified block diagram of at least one embodiment of an accelerator device of the computing device of FIG. 1.

Referring now to FIG. 2, an illustrative embodiment of a field-programmable gate array (FPGA) 200 is shown. As shown, the FPGA 200 is one potential embodiment of an accelerator device 136. The illustratively FPGA 200 includes a secure MMIO engine 202, a secure DMA engine 204, one or more accelerator functional units (AFUs) 206, and memory/registers 208. As described further below, the secure MMIO engine 202 and the secure DMA engine 204 perform in-line authenticated cryptographic operations on data transferred between the processor 120 (e.g., a secure enclave established by the processor) and the FPGA 200 (e.g., one or more AFUs 206). In some embodiments, the secure MMIO engine 202 and/or the secure DMA engine 204 may intercept, filter, or otherwise process data traffic on one or more cache-coherent interconnects, internal buses, or other interconnects of the FPGA 200.

Each AFU 206 may be embodied as logic resources of the FPGA 200 that are configured to perform an acceleration task. Each AFU 206 may be associated with an application executed by the computing device 100 in a secure enclave or other trusted execution environment. Each AFU 206 may be configured or otherwise supplied by a tenant or other user of the computing device 100. For example, each AFU 206 may correspond to a bitstream image programmed to the FPGA 200. As described further below, data processed by each AFU 206, including data exchanged with the trusted execution environment, may be cryptographically protected from untrusted components of the computing device 100 (e.g., protected from software outside of the trusted code base of the tenant enclave). Each AFU 206 may access or otherwise process stored in the memory/registers 208, which may be embodied as internal registers, cache, SRAM, storage, or other memory of the FPGA 200. In some embodiments, the memory 208 may also include external DRAM or other dedicated memory coupled to the FPGA 200.

Figure 3:
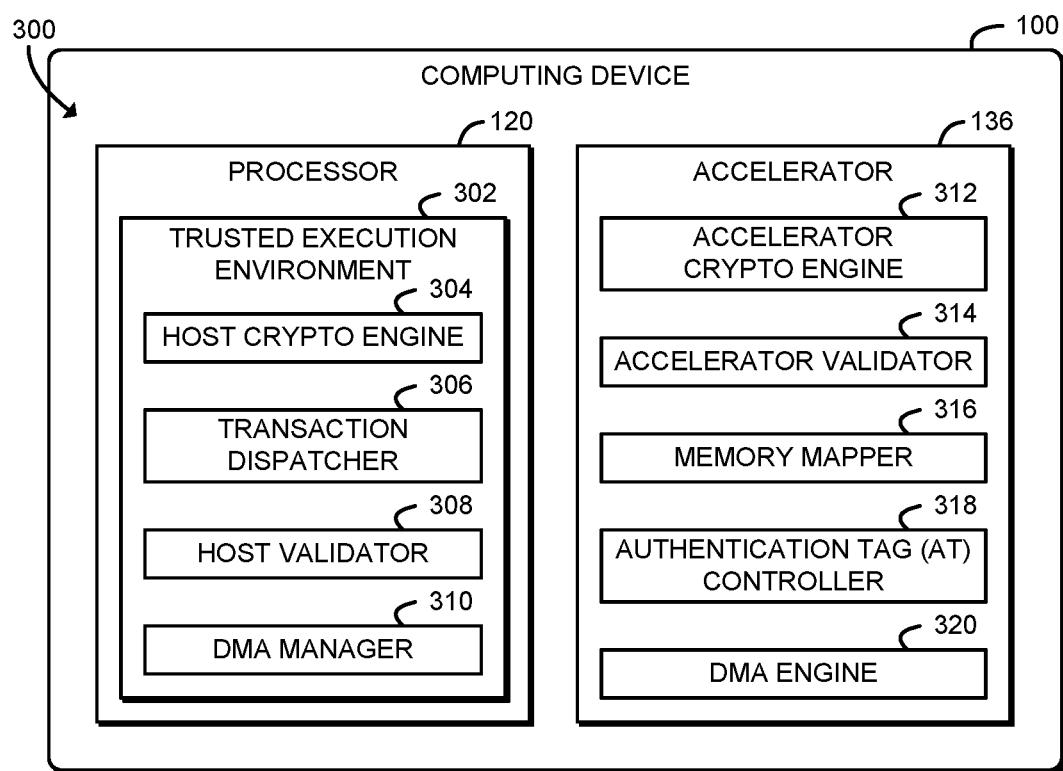
FIG. 3 is a simplified block diagram of at least one embodiment of an environment of the computing device of FIGS. 1-2.

Referring now to FIG. 3, in an illustrative embodiment, the computing device 100 establishes an environment 300 during operation. The illustrative environment 300 includes a trusted execution environment (TEE) 302 and the accelerator 136. The TEE 302 further includes a host cryptographic engine 304, a transaction dispatcher 306, a host validator 308, and a direct memory access (DMA) manager 310. The accelerator 136 includes an accelerator cryptographic engine 312, an accelerator validator 314, a memory mapper 316, an authentication tag (AT) controller 318, and a DMA engine 320. The various components of the environment 300 may be embodied as hardware, firmware, software, or a combination thereof. As such, in some embodiments, one or more of the components of the environment 300 may be embodied as circuitry or collection of electrical devices (e.g., host cryptographic engine circuitry 304, transaction dispatcher circuitry 306, host validator circuitry 308, DMA manager circuitry 310, accelerator cryptographic engine circuitry 312, accelerator validator circuitry 314, memory mapper circuitry 316, AT controller circuitry 318, and/or DMA engine circuitry 320). It should be appreciated that, in such embodiments, one or more of the host cryptographic engine circuitry 304, the transaction dispatcher circuitry 306, the host validator circuitry 308, the DMA manager circuitry 310, the accelerator cryptographic engine circuitry 312, the accelerator validator circuitry 314, the memory mapper circuitry 316, the AT controller circuitry 318, and/or the DMA engine circuitry 320 may form a portion of the processor 120, the I/O subsystem 124, the accelerator 136, and/or other components of the computing device 100. Additionally, in some embodiments, one or more of the illustrative components may form a portion of another component and/or one or more of the illustrative components may be independent of one another.

The TEE 302 may be embodied as a trusted execution environment of the computing device 100 that is authenticated and protected from unauthorized access using hardware support of the computing device 100, such as the secure enclave support 122 of the processor 120. Illustratively, the TEE 302 may be embodied as one or more secure enclaves established using Intel SGX technology. The TEE 302 may also include or otherwise interface with one or more drivers, libraries, or other components of the computing device 100 to interface with the accelerator 136.

The host cryptographic engine 304 is configured to generate an authentication tag (AT) based on a memory-mapped I/O (MMIO) transaction and to write that AT to an AT register of the accelerator 136. For an MMIO write request, the host cryptographic engine 304 is further configured to encrypt a data item to generate an encrypted data item, and the AT is generated in response to encrypting the data item. For an MMIO read request, the AT is generated based on an address associated with MMIO read request.

The transaction dispatcher 306 is configured to dispatch the memory-mapped I/O transaction (e.g., an MMIO write request or an MMIO read request) to the accelerator 136 after writing the calculated AT to the AT register. An MMIO write request may be dispatched with the encrypted data item.

The host validator 308 may be configured to verify that an MMIO write request succeeded in response dispatching the MMIO write request. Verifying that the MMIO write request succeeded may include securely reading a status register of the accelerator 136, securely reading a value at the address of the MMIO write from the accelerator 136, or reading an AT register of the accelerator 136 that returns an AT value calculated by the accelerator 136, as described below. For MMIO read requests, the host validator 308 may be further configured to generate an AT based on an encrypted data item included in a MMIO read response dispatched from the accelerator 136; read a reported AT from a register of the accelerator 136; and determine whether the AT generated by the TEE 302 matches the AT reported by the accelerator 136. The host validator 308 may be further configured to indicate an error if those ATs do not match, which provides assurance that data was not modified on the way from the TEE 302 to the accelerator 136.

The accelerator cryptographic engine 312 is configured to perform a cryptographic operation associated with the MMIO transaction and to generate an AT based on the MMIO transaction in response to the MMIO transaction being dispatched. For an MMIO write request, the cryptographic operation includes decrypting an encrypted data item received from the TEE 302 to generate a data item, and the AT is generated based on the encrypted data item. For an MMIO read request, the cryptographic operation includes encrypting a data item from a memory of the accelerator 136 to generate an encrypted data item, and the AT is generated based on that encrypted data item.

The accelerator validator 314 is configured to determine whether the AT written by the TEE 302 matches the AT determined by the accelerator 136. The accelerator validator 314 is further configured to drop the MMIO transaction if those ATs do not match. For MMIO read requests, the accelerator validator 314 may be configured to generate a poisoned AT in response to dropping the MMIO read request, and may be further configured to dispatch a MMIO read response with a poisoned data item to the TEE 302 in response to dropping the MMIO read request.

The memory mapper 316 is configured to commit the MMIO transaction in response to determining that the AT written by the TEE 302 matches the AT generated by the accelerator 136. For an MMIO write request, committing the transaction may include storing the data item in a memory of the accelerator 136. The memory mapper 316 may be further configured to set a status register to indicate success in response to storing the data item. For an MMIO read request, committing the transaction may include reading the data item at the address in the memory of the accelerator 136 and dispatching an MMIO read response with the encrypted data item to the TEE 302.

The DMA manager 310 is configured to securely write an initialization command to the accelerator 136 to initialize a secure DMA transfer. The DMA manager 310 is further configured to securely configure a descriptor indicative of a host memory buffer, an accelerator 136 buffer, and a transfer direction. The transfer direction may be host to accelerator 136 or accelerator 136 to host. The DMA manager 310 is further configured to securely write a finalization command to the accelerator 136 to finalize an authentication tag (AT) for the secure DMA transfer. The initialization command, the descriptor, and the finalization command may each be securely written and/or configured with an MMIO write request. The DMA manager 310 may be further configured to determine whether to transfer additional data in response to securely configuring the descriptor, the finalization command may be securely written in response to determining that no additional data remains for transfer.

The AT controller 318 is configured to initialize an AT in response to the initialization command from the TEE 302. The AT controller 318 is further configured to finalize the AT in response to the finalization command from the TEE 302.

The DMA engine 320 is configured to transfer data between the host memory buffer and the accelerator 136 buffer in response to the descriptor from the TEE 302. For a transfer from host to accelerator 136, transferring the data includes copying encrypted data from the host memory buffer and forwarding the plaintext data to the accelerator 136 buffer in response to decrypting the encrypted data. For a transfer from accelerator 136 to host, transferring the data includes copying plaintext data from the accelerator 136 buffer and forwarding encrypted data to the host memory buffer in response encrypting the plaintext data.

The accelerator cryptographic engine 312 is configured to perform a cryptographic operation with the data in response to transferring the data and to update the AT in response to transferring the data. For a transfer from host to accelerator 136, performing the cryptographic operation includes decrypting encrypted data to generate plaintext data. For a transfer from accelerator 136 to host, performing the cryptographic operation includes encrypting plaintext data to generate encrypted data.

The host validator 308 is configured to determine an expected AT based on the secure DMA transfer, to read the AT from the accelerator 136 in response to securely writing the finalization command, and to determine whether the AT from the accelerator 136 matches the expected AT. The host validator 308 may be further configured to indicate success if the ATs match and to indicate failure if the ATs do not match.

Figure 4:
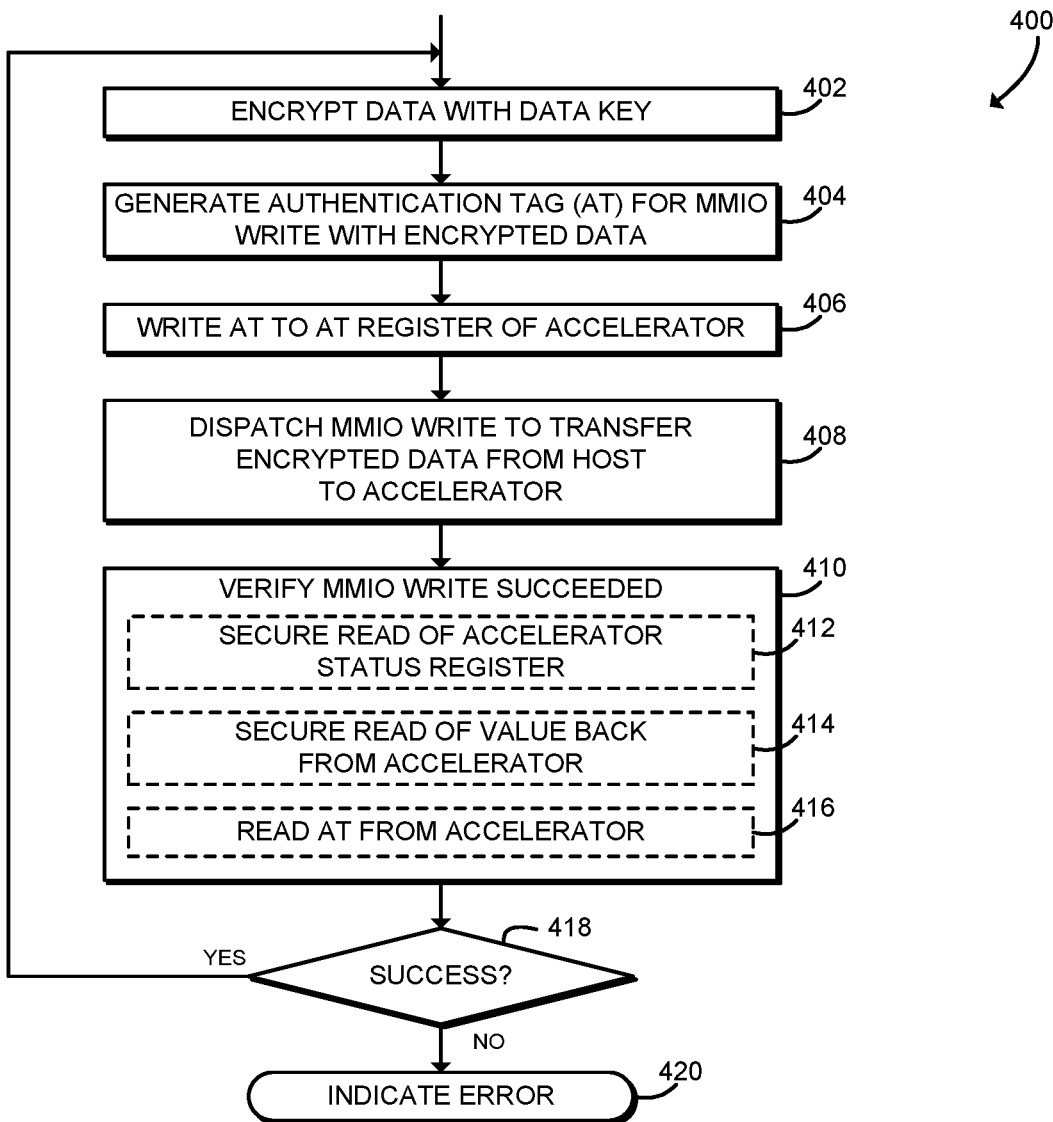
FIG. 4 is a simplified flow diagram of at least one embodiment of a method for secure memory-mapped I/O writes that may be executed by a computing device of FIGS. 1-3.

Referring now to FIG. 4, in use, the computing device 100 may execute a method 400 for secure memory-mapped I/O (MMIO) write requests. It should be appreciated that, in some embodiments, the operations of the method 400 may be performed by one or more components of the environment 300 of the computing device 100 as shown in FIG. 3, such as the trusted execution environment 302. The method 400 begins in block 402, in which the TEE 302 encrypts data with a data key. The data may be embodied as a 32-bit value, a 64-bit value, or other relatively small data item. For example, the data may be a value or values that are to be written to a register or other memory location of the accelerator 136 (e.g., a register 208 associated with an AFU 206). The data key may be securely provisioned to both the TEE 302 and the accelerator 136 ahead of time using any appropriate technique. The data is illustratively encrypted with the AES Galois/counter mode (AES-GCM) authenticated encryption algorithm. In other embodiments, the data may be encrypted with any other appropriate cryptographic algorithm.

In block 404, the TEE 302 generates an authentication tag (AT) for the MMIO write request with the encrypted data. As described above, the AT may be generated with the encrypted data using an authenticated encryption algorithm such as AES-GCM. The AT may be embodied as any hash, message authentication code, or other value that may be used to authenticated the encrypted data and additional authenticated data. The additional authenticated data may include, for example, an address associated with the MMIO write request, such as a memory address, register offset, or other addressing information.

In block 406, the TEE 302 writes the AT to an AT register of the accelerator 136. The AT may be written with an unsecure MMIO or other operation. For example, the AT may be embodied as a 128-bit value and may be written to the accelerator 136 with two 64-bit unsecure write operations. Note that if the AT is intercepted or otherwise modified by a malicious actor, then as described further below, the accelerator 136 will determine that the MMIO write is invalid and will drop the MMIO write.

In block 408, the TEE 302 dispatches the MMIO write request to transfer the encrypted data from the host (i.e., the TEE 302, an associated driver, or other software executed by the processor 120) to the accelerator 136. The MMIO write request may be dispatched using an unsecure MMIO engine 128 or other MMIO component of the computing device 100. As described below in connection with FIG. 5, a secure MMIO component of the accelerator 136 (e.g., the secure MMIO 202 of an FPGA 200) decrypts and verifies the MMIO write request transaction.

In block 410, the TEE 302 may verify that the MMIO write request succeeded. Additionally or alternatively, in certain situations there may be no need to verify that the MMIO write request succeeded, in which case the TEE 302 may omit verifying that the MMIO write request succeeded. For example, the TEE 302 may only verify MMIO write requests to registers of the accelerator 136 that could affect the reliability of results. As another example, if failure to successfully perform the MMIO write request can be detected later in a different operation, verification of the MMIO write request may be omitted.

The TEE 302 may use any appropriate technique to verify that the MMIO write request was successfully performed by the accelerator 136. In some embodiments, in block 412, the TEE 302 may securely read a status register of the accelerator 136. The status register may be set by the accelerator 136 if the MMIO write was performed successfully. To perform the secure read, the TEE 302 may execute a secure MMIO read request as described below in connection with FIGS. 6-7. In some embodiments, in block 414, the TEE 302 may securely read a value back from the accelerator 136 at the address of the MMIO write (e.g., read back the same register). The TEE 302 may compare the value read from the accelerator 136 with the original data item and determine whether those values match. The value may be read with a secure MMIO read request as described below in connection with FIGS. 6-7. Reading back the value may not be possible for registers or memory locations with side effects or for write-only registers or memory locations. In some embodiments, in block 416, the TEE 302 may read an AT from the accelerator 136 that is generated by the accelerator 136. The TEE 302 may compare the AT read from the accelerator 136 with the AT generated by the TEE 302 and determine whether those ATs match. The AT may be read with one or more unsecure MMIO read requests or other transfers. In some embodiments, each AT may be a 128-bit value, and thus reading the AT may require two 64-bit MMIO read operations. The AT does not need to be read securely, because by modifying an AT, an attacker could only create a denial of service attack, as verification will fail and the TEE 302 will consider the transfer to have failed.

In block 418, the TEE 302 checks whether the MMIO write request was completed successfully. If not, the method 400 braches to block 420, in which the TEE 302 may indicate an error or otherwise indicate that the MMIO write request was not successful. In response, the TEE 302 may halt, retry the MMIO write, or perform another operation. Referring back to block 418, if the MMIO write request was completed successfully, the method 400 loops back to block 402 to perform additional MMIO write requests.

Figure 5:
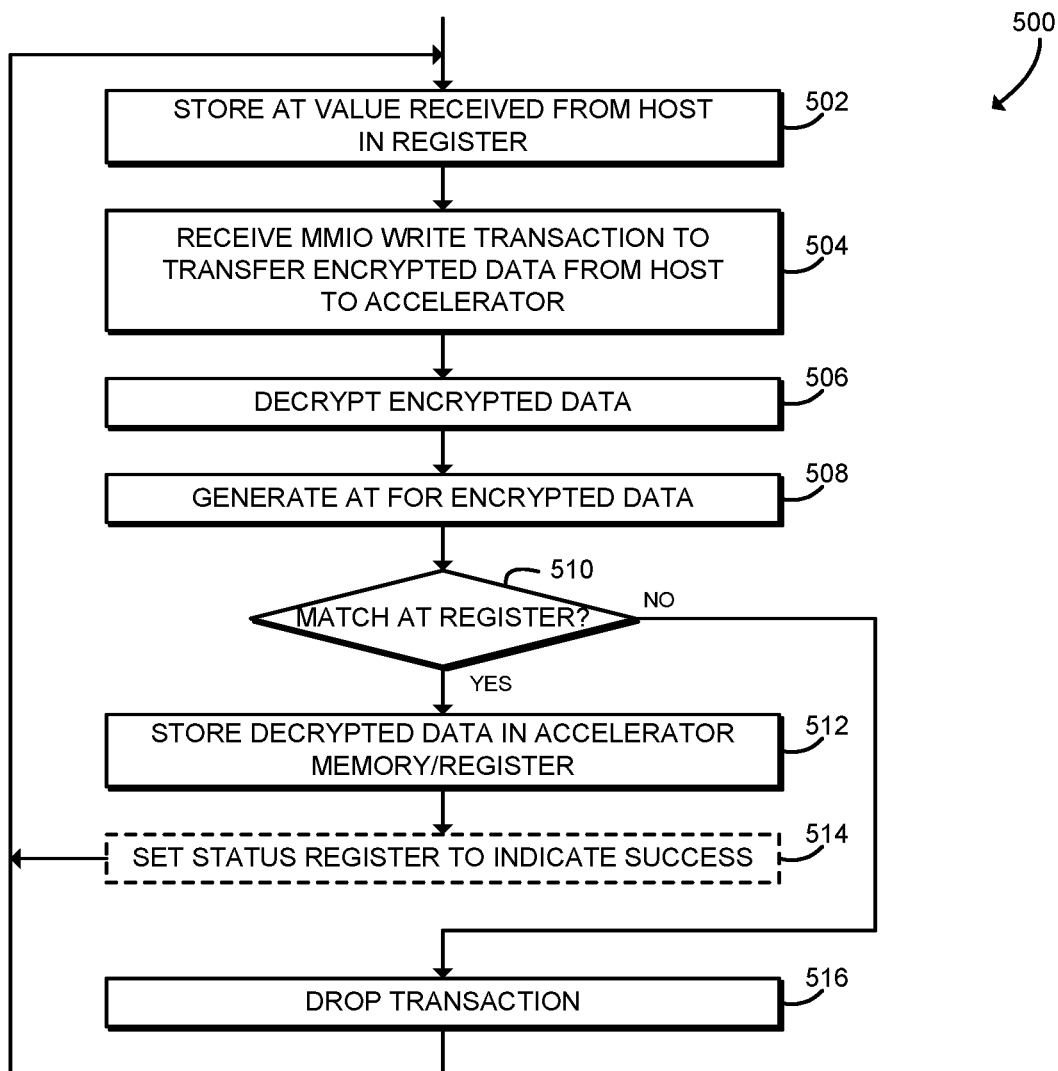
FIG. 5 is a simplified flow diagram of at least one embodiment of a method for secure memory-mapped I/O writes that may be executed by an accelerator device of FIGS. 1-3.

Referring now to FIG. 5, in use, the computing device 100 may execute a method 500 for secure MMIO write requests. It should be appreciated that, in some embodiments, the operations of the method 500 may be performed by one or more components of the environment 300 of the computing device 100 as shown in FIG. 3, such as the accelerator 136. The method 500 begins in block 502, in which the accelerator 136 stores an authentication tag (AT) value received from the TEE 302. As described above, the AT is generated by the TEE 302 based on the encrypted data item that is to be written to the accelerator 136. The AT may be written with an unsecure MMIO write or other operation. For example, the AT may be embodied as a 128-bit value and may be written to the accelerator 136 with two 64-bit unsecure write operations.

In block 504, the accelerator 136 receives an MMIO write request transaction to transfer encrypted data from the host (i.e., the TEE 302, an associated driver, or other software executed by the processor 120) to the accelerator 136. As described above, the MMIO write request may be received from an unsecure MMIO engine 128 or other MMIO component of the computing device 100. The encrypted data may be embodied as a 32-bit value, a 64-bit value, or other relatively small data item. The MMIO write request may include the encrypted data as well as an associated address such as a memory address, register offset, or other addressing information.

In block 506, the accelerator 136 decrypts the encrypted data using a data key. As described above, the data key may be securely provisioned to both the TEE 302 and the accelerator device 136 ahead of time using any appropriate technique. The data is illustratively decrypted with the AES Galois/counter mode (AES-GCM) authenticated decryption algorithm. In other embodiments, the data may be decrypted with any other appropriate cryptographic algorithm. The plaintext data generated from decryption may be a value or values that are to be written to a register or other memory location of the accelerator 136 (e.g., a register 208 associated with an AFU 206).

In block 508, the accelerator 136 generates an AT for the MMIO write request using the encrypted data received from the TEE 302. As described above, the AT may be generated based on the encrypted data using an authenticated encryption algorithm such as AES-GCM. The AT may be embodied as any hash, message authentication code, or other value that may be used to authenticated the encrypted data and additional authenticated data. The additional authenticated data may include, for example, the address associated with the MMIO write.

In block 510, the accelerator 136 determines whether the AT generated by the accelerator 136 matches the AT written by the TEE 302. If not, the method 500 branches to block 516, described below. If the AT values match, the method 500 advances to block 512.

In block 512, the accelerator 136 stores the decrypted, plaintext data in an accelerator 136 memory, register, or other storage location. For example, the plaintext data may be stored in a register 208 of an FPGA 200, in another memory 208 included in the FPGA 200, or in an external memory device coupled to the FPGA 200. The register or storage location may be identified with the address of the MMIO write transaction. After being stored, the plaintext data may be processed or otherwise accessed by the accelerator 136, for example by an AFU 206 of the FPGA 200. In some embodiments, in block 514 the accelerator 136 may set a status register to indicate the MMIO write request was performed successfully. As described above, the TEE 302 may securely read the status register to verify the MMIO write request. After committing the MMIO write request and in some embodiments setting the status register, the method 500 loops back to block 502 to perform additional MMIO write requests.

Referring back to block 510, if the AT generated by the accelerator 136 and the AT written by the TEE 302 do not match, then the method 500 branches to block 516, in which the accelerator 136 drops the MMIO write transaction. The accelerator 136 may also set a status register to indicate that the MMIO write request was not performed successfully. The plaintext value is not written to the memory of the accelerator 136. Thus, the accelerator 136 may be protected from certain malicious attacks. For example, a malicious actor may submit a false MMIO write transaction to the accelerator 136. In that circumstance, an AT value written by the TEE 302 would not match the AT value calculated for the false MMIO transaction, and the malicious actor would not be able to calculate a correct AT value because the data key is secret. As another example, a malicious actor may write a false AT value to the accelerator 136. In that circumstance, the AT value calculated by the accelerator 136 based on the MMIO write request (e.g., the MMIO write request dispatched by the TEE 302) would not match the false AT value, and the MMIO write request would be dropped. After dropping the MMIO write transaction, the method 500 loops back to block 502 to perform additional MMIO write requests.

Figure 6:
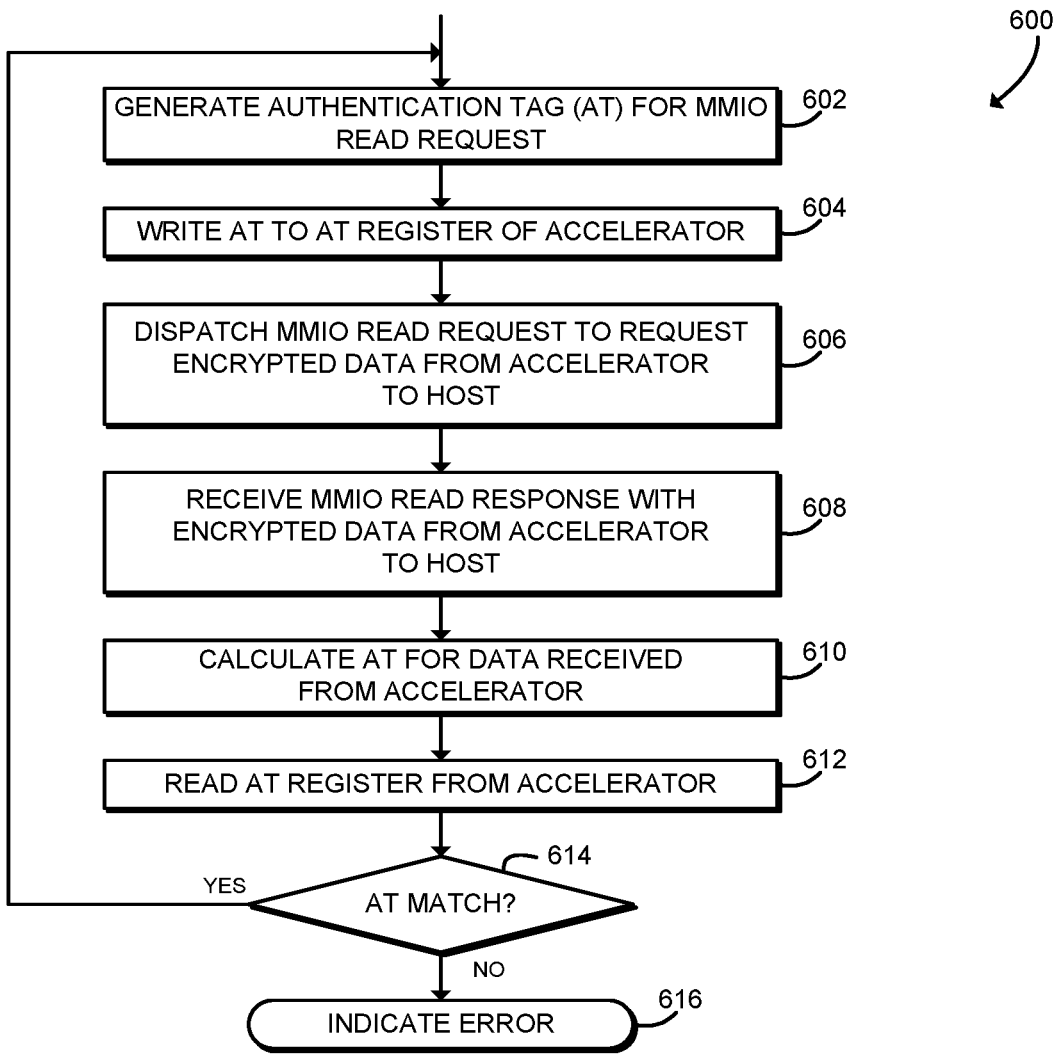
FIG. 6 is a simplified flow diagram of at least one embodiment of a method for secure memory-mapped I/O reads that may be executed by a computing device of FIGS. 1-3.

Referring now to FIG. 6, in use, the computing device 100 may execute a method 600 for secure memory-mapped I/O read operations. As described further below, an MMIO read operation includes two MMIO transactions, an MMIO read request and an MMIO read response. It should be appreciated that, in some embodiments, the operations of the method 600 may be performed by one or more components of the environment 300 of the computing device 100 as shown in FIG. 3, such as the trusted execution environment 302. The method 600 begins in block 602, in which the TEE 302 generates an authentication tag (AT) for an MMIO read request. The AT may be generated using an authenticated encryption algorithm such as AES-GCM. Instead of generating the AT based on encrypted data, the AT may be based on a known value, such as a block of 128 "zero" bits or other predetermined constant. The AT may be embodied as any hash, message authentication code, or other value that may be used to authenticated the supplied value and additional authenticated data. The additional authenticated data may include, for example, an address associated with the MMIO read request, such as a memory address, register offset, or other addressing information.

In block 604, the TEE 302 writes the AT to an AT register of the accelerator 136. The AT may be written with an unsecure MMIO write or other operation. For example, the AT may be embodied as a 128-bit value and may be written to the accelerator 136 with two 64-bit unsecure write operations. Note that if the AT is intercepted or otherwise modified by a malicious actor, then as described further below, the accelerator 136 will determine that the MMIO read request is invalid and will drop the MMIO read request.

In block 606, the TEE 302 dispatches the MMIO read request to the accelerator 136. The MMIO read request may be dispatched using an unsecure MMIO engine 128 or other MMIO component of the computing device 100. As described below in connection with FIG. 5, a secure MMIO component of the accelerator 136 (e.g., the secure MMIO 202 of an FPGA 200) decrypts and verifies the MMIO read request transaction. If the MMIO read request is successfully verified, the accelerator 136 dispatches an MMIO read response.

In block 608, the TEE 302 receives an MMIO read response from the accelerator 136. As described further below, the MMIO read response may include encrypted data that was originally read by the accelerator 136 from a memory, register, or other storage of the accelerator 136 and then encrypted by the accelerator 136. The MMIO read response may be received using the unsecure MMIO engine 128 or other MMIO component of the computing device 100.

In block 610, the TEE 302 calculates an AT for the encrypted data received from the accelerator 136 with the MMIO read response. As described above, the AT may be generated with the encrypted data using an authenticated encryption algorithm such as AES-GCM. The AT may be embodied as any hash, message authentication code, or other value that may be used to authenticated the encrypted data and additional authenticated data. The additional authenticated data may include, for example, an address associated with the MMIO read response, such as a memory address, register offset, or other addressing information.

In block 612, the TEE 302 reads an AT register from the accelerator 136. The AT register includes an AT that was generated by the accelerator 136 based on the MMIO read response. The AT may be read with one or more unsecure MMIO reads. For example, the AT may be a 128-bit value, reading the AT may require two 64-bit MMIO unsecure read operations. In block 614, the TEE 302 compares the AT read from the accelerator 136 with the AT generated by the TEE 302 and determines whether those ATs match. If the ATs do not match, then the method 600 branches to block 616, in which the TEE 302 may indicate an error or otherwise indicate that the MMIO read request was not successful. In response, the TEE 302 may halt, retry the MMIO read request, or perform another operation. Referring back to block 614, if the ATs match, the method 600 loops back to block 602 to perform additional MMIO read requests. The TEE 302, an application, or other component of the computing device 100 may decrypt the encrypted data included with the MMIO read response and otherwise process the received data.

Figure 7:
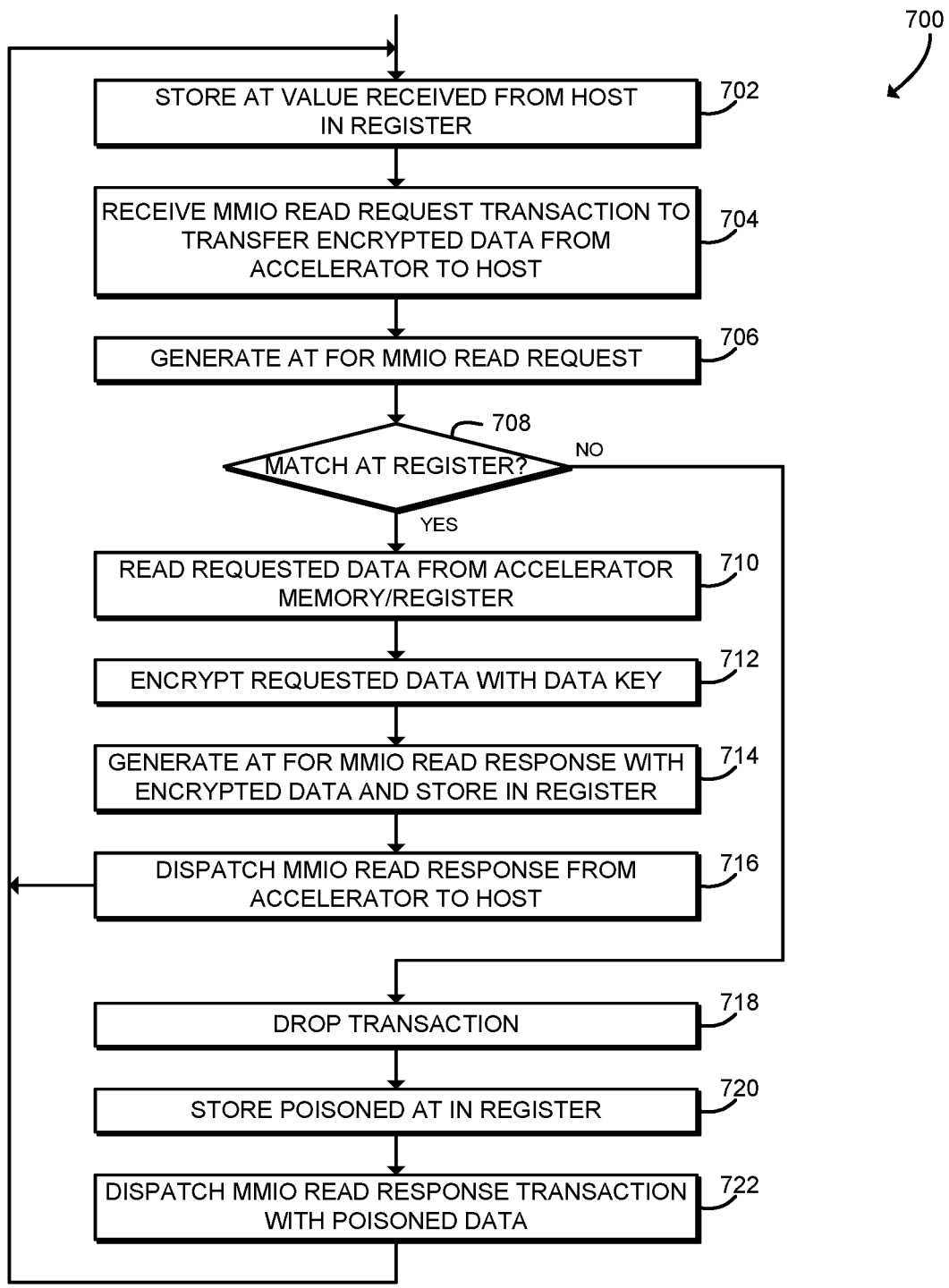
FIG. 7 is a simplified flow diagram of at least one embodiment of a method for secure memory-mapped I/O reads that may be executed by the accelerator device of FIGS. 1-3.

Referring now to FIG. 7, in use, the computing device 100 may execute a method 700 for secure memory-mapped I/O read operations. It should be appreciated that, in some embodiments, the operations of the method 700 may be performed by one or more components of the environment 300 of the computing device 100 as shown in FIG. 3, such as the accelerator 136. The method 700 begins in block 702, in which the accelerator 136 stores an authentication tag (AT) value received from the TEE 302. As described above, the AT is generated by the TEE 302 based on an MMIO read request. The AT may be written with an unsecure MMIO or other operation. For example, the AT may be embodied as a 128-bit value and may be written to the accelerator 136 with two 64-bit unsecure write operations.

In block 704, receives an MMIO read request that requests a transfer of encrypted data from the accelerator 136 to the host (i.e., to the TEE 302, an associated driver, or other software executed by the processor 120). As described above, the MMIO read request may be received from an unsecure MMIO engine 128 or other MMIO component of the computing device 100. The requested data may be embodied as a 32-bit value, a 64-bit value, or other relatively small data item. The MMIO read request may specify associated address such as a memory address, register offset, or other addressing information of the requested data.

In block 706, the accelerator 136 generates an AT for the MMIO read request based on the MMIO read request received from the TEE 302. As described above, the AT may be generated using an authenticated encryption algorithm such as AES-GCM. Instead of generating the AT based on encrypted data, the AT may be based on a known value, such as a block of 128 "zero" bits or other predetermined constant. The AT may be embodied as any hash, message authentication code, or other value that may be used to authenticated the supplied value and additional authenticated data. The additional authenticated data may include, for example, an address associated with the MMIO read request, such as a memory address, register offset, or other addressing information.

In block 708, the accelerator 136 determines whether the AT generated by the accelerator 136 matches the AT written by the TEE 302. If not, the method 700 branches to block 718, described below. If the AT values match, the method 700 advances to block 710.

In block 710, the accelerator 136 reads the requested plaintext data from a memory, register, or other storage location of the accelerator 136. For example, the plaintext data may be read from a register 208 of an FPGA 200, from another memory 208 included in the FPGA 200, or from an external memory device coupled to the FPGA 200. The register or storage location may be identified with the address of the MMIO read request. The plaintext data may include acceleration results or other data generated by the accelerator 136, for example by an AFU 206 of the FPGA 200.

In block 712, the accelerator 136 encrypts the plaintext data using a data key. As described above, the data key may be securely provisioned to both the TEE 302 and the accelerator device 136 ahead of time using any appropriate technique. The data is illustratively encrypted with the AES Galois/counter mode (AES-GCM) authenticated encryption algorithm. In other embodiments, the data may be encrypted with any other appropriate cryptographic algorithm. The encrypted data generated from encryption may be a value or values that are to be returned to the TEE 302 as an MMIO read response.

In block 714, the accelerator 136 generates an AT for the MMIO read response using the encrypted data. As described above, the AT may be generated with the encrypted data using an authenticated encryption algorithm such as AES-GCM. The AT may be embodied as any hash, message authentication code, or other value that may be used to authenticated the encrypted data and additional authenticated data. The additional authenticated data may include, for example, the address associated with the MMIO read response.

In block 716, the accelerator 136 dispatches the MMIO read response to the TEE 302. The MMIO read response includes the encrypted data generated by the accelerator 136. As described above, the MMIO read response may be received by the TEE 302 using the unsecure MMIO engine 128 or other MMIO component of the computing device 100. Also as described above, the TEE 302 may verify the MMIO read response by reading the AT calculated by the accelerator 136 from one or more registers of the accelerator 136. After dispatching the MMIO read response, the method 700 loops back to block 702 to perform additional MMIO read operations.

Referring back to block 708, if the AT generated by the accelerator 136 and the AT written by the TEE 302 do not match, then the method 500 branches to block 718, in which the accelerator 136 drops the MMIO read request transaction. The accelerator 136 does not read the requested value from the memory or other storage of the accelerator 136. In block 720, in some embodiments, the accelerator 136 may store a poisoned AT value in an AT register. The poisoned AT value may be a predetermined value, an AT generated based on a predetermined value, or another incorrect AT value. As described above, the TEE 302 reads the AT register to verify the MMIO read response received from the accelerator 136. The TEE 302 may determine that the MMIO read request was dropped based on the poisoned AT value, for example, by determining that the poisoned AT value does not match an AT value calculated over the MMIO read response. Similarly, in some embodiments, in block 722 the accelerator 136 may dispatch an MMIO read response transaction with poisoned data. The poisoned data may be embodied as, for example, a predetermined value or other constant that may be detected by the TEE 302. As another example, the poisoned data may be an arbitrary value that, when verified by the TEE 302, does not match the poisoned AT value. After dropping the MMIO read request transaction, the method 700 loops back to block 702 to continue processing MMIO read operations.

Figure 8:
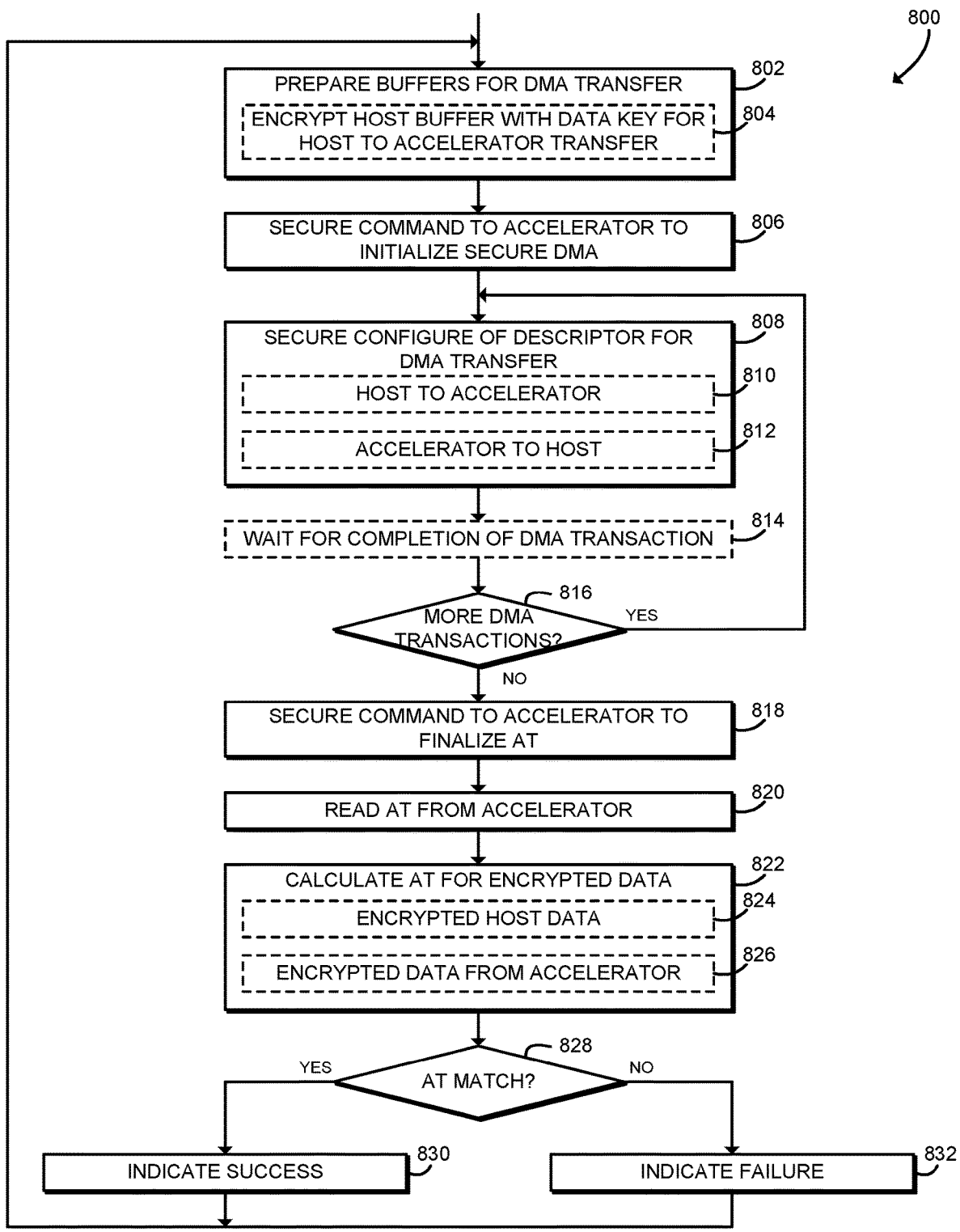
FIG. 8 is a simplified flow diagram of at least one embodiment of a method for secure direct memory access transactions that may be executed by the computing device of FIGS. 1-3.

Referring now to FIG. 8, in use, the computing device 100 may execute a method 800 for secure direct memory access (DMA) transfers. It should be appreciated that, in some embodiments, the operations of the method 800 may be performed by one or more components of the environment 300 of the computing device 100 as shown in FIG. 3, such as the trusted execution environment 302. The method 800 begins in block 802, in which the TEE 302 prepares one or more memory buffers for a DMA transfer. For example, the TEE 302 may allocate a circular buffer in the host memory 130. As described further below, the buffer may be divided into multiple blocks of data that may each be transferred in a single DMA transaction. For example, the buffer may include multiple 512-bit blocks. In some embodiments, the buffer may be aligned on a block boundary in the memory 130 (e.g., 64-byte aligned). If the buffer is not aligned in memory, data located before the first block boundary and/or after the last block boundary may be transferred using one or more secure MMIO operations, as described above in connection with FIGS. 4-7. In some embodiments, in block 804, the TEE 302 may encrypt data in the host buffer with a data key for a host to accelerator 136 transfer. The data key may be securely provisioned to both the TEE 302 and the accelerator device 136 ahead of time using any appropriate technique. The data is illustratively encrypted with the AES Galois/counter mode (AES-GCM) authenticated encryption algorithm. In other embodiments, the data may be encrypted with any other appropriate cryptographic algorithm.

In block 806, the TEE 302 securely commands the accelerator 136 to initialize a secure DMA transfer. The TEE 302 may, for example, perform a secure MMIO write to a register of the accelerator 136 to cause the accelerator 136 to initialize the secure DMA transfer. As described further below, the accelerator 136 may initialize an authentication tag (AT) and/or other state data in response to the command to initialize the secure DMA transfer.

In block 808, the TEE 302 securely configures a descriptor for the DMA transfer. The TEE 302 may, for example, perform one or more secure MMIO writes to a register, command buffer, or other address of the accelerator 136 to provide the descriptor. The descriptor includes data describing the secure DMA transaction, including a source address, a destination address, a length, and a direction of transfer.

The descriptor may also include additional data, such as a last flag that instructs the accelerator 136 to raise an interrupt or otherwise notify the TEE 302 after performing the DMA transaction. In some embodiments, in block 810 the descriptor may indicate a host to accelerator 136 transfer. In those embodiments the source address may identify a host buffer in the memory 130 that includes encrypted data, and the destination address may identify an accelerator buffer in a memory of the accelerator 136. In some embodiments, in block 812 the descriptor may indicate an accelerator 136 to host transfer. In those embodiments the source address may identify an accelerator buffer in a memory of the accelerator 136, and the destination address may identify a host buffer in the memory 130.

In some embodiments, the TEE 302 may program multiple descriptors securely and then instruct the accelerator 136 to start transferring data. In those embodiments, the accelerator 136 will read the first descriptor and perform the transfer, and then read the second descriptor and perform the transfer, and so on, until the accelerator 136 has completed transfers for all programmed descriptors. The accelerator 136 may then ask the TEE 302 if there are more transfers. The transfers will thus continue until the TEE 302 acting as master has completed all transfers. At that point, the TEE 302 will issue a finalize command, as described further below. After configuring the descriptor or descriptors, the accelerator 136 performs the secure DMA transaction and updates the corresponding AT as described further below in connection with FIG. 9.

In some embodiments, in block 814 the TEE 302 may wait for completion of the secure DMA transaction. For example, in some embodiments the TEE 302 may wait for an interrupt raised by the accelerator 136 or the TEE 302 may poll for a completion. In block 816, the TEE 302 determines whether additional DMA transactions remain to be executed. If additional DMA transactions remain for transfer, the method 500 loops back to block 808 to continue configuring descriptors for DMA transactions. For example, as described above, in some embodiments the source buffer may include multiple 512-bit blocks that may each be transferred in a single DMA transaction. The TEE 302 may continue to configure descriptors for each block until the entire buffer is transferred. Continuing that example, the TEE 302 may set the last flag for the last descriptor to be transferred and wait for an interrupt from the accelerator 136, indicating that all blocks have been transferred. As another example, the TEE 302 may divide the buffer into two sub-buffers, or ping-pong buffers. The TEE 302 may configure descriptors for one of the sub-buffers and set the last flag for the last descriptor in the sub-buffer. On receiving the interrupt, the TEE 302 may similarly configure the descriptors of the other sub-buffer. In that fashion, the TEE 302 may ensure that entries in a circular buffer are not overwritten and that an interrupt will not be lost, because at most one of the descriptors in flight has the last flag set. Referring back to block 816, if no more DMA transactions remain to be executed, the method 800 advances to block 818.

In block 818, the TEE 302 securely commands the accelerator 136 to finalize the AT. As described above, the TEE 302 may, for example, perform a secure MMIO write to a register of the accelerator 136 to cause the accelerator 136 to finalize the AT. The accelerator 136 may finalize the AT as described below in connection with FIG. 9.

In block 820, the TEE 302 reads the AT from the accelerator 136. The TEE 302 may read, for example, an AT register that includes an AT generated by the accelerator 136 based on the DMA transactions performed by the accelerator 136. The AT may be read with one or more unsecure MMIO reads. For example, the AT may be a 128-bit value, reading the AT may require two 64-bit MMIO unsecure read operations.

In block 822, the TEE calculates an expected AT for encrypted data associated with the secure DMA transfer. As described above, the AT may be generated with the encrypted data using an authenticated encryption algorithm such as AES-GCM. The AT may be embodied as any hash, message authentication code, or other value that may be used to authenticated the encrypted data and additional authenticated data. The encrypted data used to generate the AT depends on the direction of transfer. In some embodiments, in block 824, the AT may be generated based on encrypted host data in the host buffer for a host to accelerator 136 transfer. The encrypted host data may be generated, for example, by the TEE 302, an application, or other entity of the computing device 100. In some embodiments, in block 826, the AT may be generated based on encrypted data received from the accelerator 136 for an accelerator 136 to host transfer.

In block 828, the TEE 302 determines whether the AT read from the accelerator 136 matches the expected AT. If so, the method 800 branches to block 830, in which the TEE 302 may indicate that the secure DMA transfer was completed successfully. The method 800 then loops back to block 802 to perform additional secure DMA transfers. Referring back to block 828, if the ATs do not match, then the method 800 branches to block 832, in which the TEE 302 may indicate a failure or otherwise indicate that the secure DMA transfer was not completed successfully. The TEE 302 may halt, retry the DMA transaction, or perform another operation. The method 800 may then loop back to block 802 to perform additional secure DMA transfers.

Figure 9:
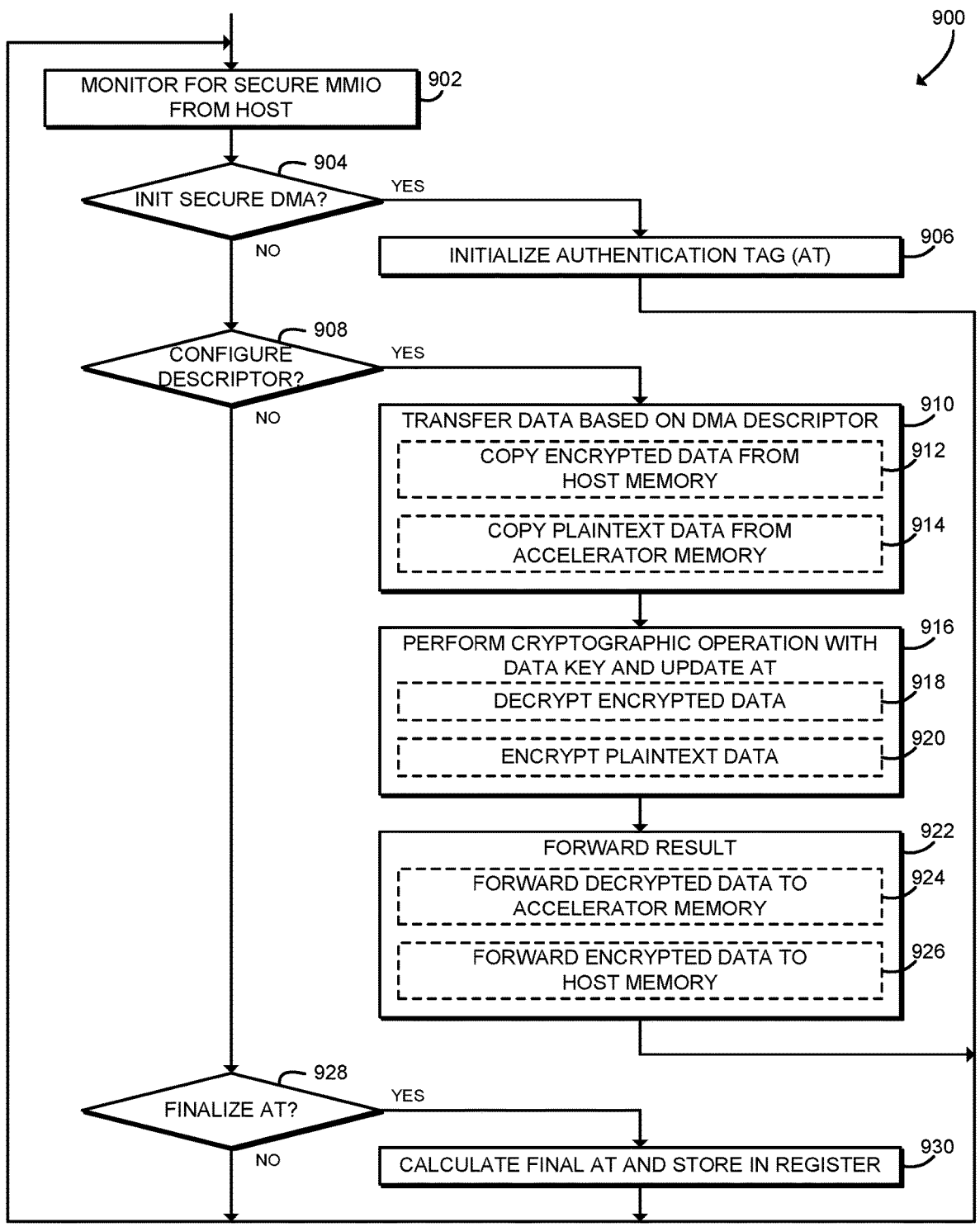
FIG. 9 is a simplified flow diagram of at least one embodiment of a method for secure direct memory access transactions that may be executed by the accelerator device of FIGS. 1-3.

Referring now to FIG. 9, in use, the computing device 100 may execute a method 900 for secure direct memory access transfers. It should be appreciated that, in some embodiments, the operations of the method 900 may be performed by one or more components of the environment 300 of the computing device 100 as shown in FIG. 3, such as the accelerator 136. The method 900 begins in block 902, in which the accelerator 136 monitors for secure commands received from the host (e.g., from the TEE 302). For example, the accelerator 136 may monitor for secure MMIO write requests to one or more registers, descriptor queues, or other memory locations of the accelerator device 136.

In block 904, the accelerator 136 determines whether a command to initialize a secure DMA transfer has been received. If not, the method 900 advances to block 908, described below. If a command to initialize the secure DMA transfer is received, the method 900 branches to block 906, in which the accelerator 136 initializes an authentication tag (AT). The accelerator 136 may, for example, initialize one or more registers, start one or more encryption pipelines, pre-calculate masks, or otherwise prepare the accelerator 136 for calculating AT values. After initializing the AT, the method 900 loops back to block 902 to continue monitoring for commands.

In block 908, the accelerator 136 determines whether a descriptor has been configured. If not, the method 900 advances to block 928, described below. If a descriptor has been configured, the method 900 branches to block 910, in which the accelerator 136 transfers data by executing a DMA transaction based on the descriptor. The accelerator 136 may transfer the data, for example, using one or more DMA engines or other components of the accelerator 136.

The particular data transferred depends on the direction of transfer, which is indicated by the descriptor. The descriptor also provides a source address and a destination address for the transfer. In some embodiments, for host to accelerator 136 transfers, in block 912 the accelerator 136 may copy encrypted data from the host memory 130 to the accelerator 136. In some embodiments, for accelerator 136 to host transfers, in block 914 the accelerator 136 may copy plaintext data from a memory, register, or other storage of the accelerator 136.

In block 916, the accelerator 136 performs a cryptographic operation on the transferred data using a data key. The accelerator 136 may, for example, intercept the data transfer on a cache-coherent interconnect or other internal interconnect of the accelerator 136. As described above, the data key may be securely provisioned to both the TEE 302 and the accelerator 136 ahead of time using any appropriate technique. The cryptographic operation is illustratively an AES Galois/counter mode (AES-GCM) authenticated cryptographic algorithm. The accelerator 136 also updates the AT based on encrypted data associated with the DMA transfer. The particular cryptographic operation performed depends on the direction of the transfer. In some embodiments, for host to accelerator 136 transfers, in block 918 the accelerator 136 decrypts encrypted data received from the host to recover the plaintext data. The accelerator 136 updates the AT based on the encrypted data received from the host. In some embodiments, for accelerator 136 to host transfers, in block 920 the accelerator 136 encrypts plaintext data from the accelerator 136 memory and generates the encrypted data. The accelerator 136 updates the AT based on the encrypted data generated by the accelerator 136.

In block 922, the accelerator 136 forwards the results of the cryptographic operation to the appropriate destination. The accelerator 136 may, for example, forward the results on the cache-coherent interconnect or other internal interconnect of the accelerator 136. Both the particular data forwarded and the destination depend on the direction of the transfer. In some embodiments, for host to accelerator 136 transfers, in block 924 the accelerator 136 forwards the decrypted, plaintext data to the memory of the accelerator 136. After the plaintext data is stored in the accelerator 136 memory, the accelerator 136 may process the data, for example with an AFU 206 of the FPGA 200. In some embodiments, for accelerator 136 to host transfers, in block 926 the accelerator 136 forwards the encrypted data to the host memory 130. The encrypted data may be stored in a host buffer in the memory 130. After transfer, the encrypted data may be copied, decrypted, and/or otherwise processed by the TEE 302, by an application, or by another component of the computing device 100. After forwarding the results of the cryptographic operation, the method 900 loops back to block 902 to continue monitoring for commands.

In block 928, the accelerator 136 determines whether a command to finalize the AT has been received. If not, the method 900 loops back to block 902 to continue monitoring for commands. If a command to finalize the AT was received, the method 900 branches to block 930, in which the accelerator 136 finalizes the AT and stores the final AT value in a register. The accelerator 136 may perform any appropriate calculation to finalize the AT. For example, the AT may be updated based on the final length of all of the DMA transfers. As described above, the final AT value may be read by the TEE 302 to verify that the secure DMA transfer was performed successfully. After storing the AT value, the method 900 loops back to block 902 to continue monitoring for commands.

It should be appreciated that, in some embodiments, the methods 400, 500, 600, 700, 800, and/or 900 may be embodied as various instructions stored on a computer-readable media, which may be executed by the processor 120, the I/O subsystem 124, the accelerator 136, and/or other components of the computing device 100 to cause the computing device 100 to perform the respective method 400, 500, 600, 700, 800, and/or 900. The computer-readable media may be embodied as any type of media capable of being read by the computing device 100 including, but not limited to, the memory 130, the data storage device 132, firmware devices, other memory or data storage devices of the computing device 100, portable media readable by a peripheral device 138 of the computing device 100, and/or other media.

EXAMPLES

Illustrative examples of the technologies disclosed herein are provided below. An embodiment of the technologies may include any one or more, and any combination of, the examples described below.

Example 1 includes a computing device for secure data transfer, the computing device comprising a trusted execution environment and an accelerator device; wherein: the trusted execution environment comprises: a host cryptographic engine to (i) generate a first authentication tag based on a memory-mapped I/O transaction and (ii) write the first authentication tag to an authentication tag register of an accelerator device of the computing device; and a transaction dispatcher to dispatch the memory-mapped I/O transaction to the accelerator device in response to writing of the first authentication tag; and the accelerator device comprises: an accelerator cryptographic engine to (i) perform a cryptographic operation associated with the memory-mapped I/O transaction in response to dispatch of the memory-mapped I/O transaction and (ii) generate a second authentication tag based on the memory-mapped I/O transaction in response to the dispatch of the memory-mapped I/O transaction; an accelerator validator to determine whether the first authentication tag matches the second authentication tag; and a memory mapper to commit the memory-mapped I/O transaction in response to a determination that the first authentication tag matches the second authentication tag.

Example 2 includes the subject matter of Example 1, and wherein the accelerator validator is further to drop the memory-mapped I/O transaction in response to a determination that the first authentication tag does not match the second authentication tag.

Example 3 includes the subject matter of any of Examples 1-2, and wherein the memory-mapped I/O transaction comprises a memory-mapped I/O write, and wherein: the host cryptographic engine is further to encrypt a data item to generate an encrypted data item; to generate the first authentication tag comprises to generate the first authentication tag in response to encryption of the data item; to dispatch the memory-mapped I/O transaction comprises to dispatch the memory-mapped I/O write with the encrypted data item; to perform the cryptographic operation comprises to decrypt the encrypted data item to generate the data item; to generate the second authentication tag comprises to generate the second authentication tag based on the encrypted data item; and to commit the memory-mapped I/O transaction comprises to store the data item in a memory of the accelerator device.

Example 4 includes the subject matter of any of Examples 1-3, and wherein the memory mapper is further to set a status register to indicate success in response to storage of the data item.

Example 5 includes the subject matter of any of Examples 1-4, and wherein the trusted execution environment further comprises a host validator to verify that the memory-mapped I/O write succeeded in response to the dispatch of the memory-mapped I/O write.

Example 6 includes the subject matter of any of Examples 1-5, and wherein to verify that the memory-mapped I/O write succeeded comprises to securely read a status register of the accelerator device.

Example 7 includes the subject matter of any of Examples 1-6, and wherein to verify that the memory-mapped I/O write succeeded comprises to securely read a value at an address of the memory-mapped I/O write from the accelerator device.

Example 8 includes the subject matter of any of Examples 1-7, and wherein to verify that the memory-mapped I/O write succeeded comprises to securely read a second authentication tag register of the accelerator device.

Example 9 includes the subject matter of any of Examples 1-8, and wherein the memory-mapped I/O transaction comprises a memory-mapped I/O read request, and wherein: to generate the first authentication tag comprises to generate the first authentication tag based on an address associated with the memory-mapped I/O read request; to commit the memory-mapped I/O transaction comprises to read a data item at the address in a memory of the accelerator device in response to the determination that the first authentication tag matches the second authentication tag; and to perform the cryptographic operation further comprises to encrypt the data item to generate an encrypted data item in response to a read of the data item.

Example 10 includes the subject matter of any of Examples 1-9, and wherein: the accelerator cryptographic engine is further to generate a third authentication tag based on the encrypted data item in response to encryption of the data item; the memory mapper is further to dispatch a memory-mapped I/O read response with the encrypted data item to the trusted execution environment in response to generation of the third authentication tag; and the trusted execution environment further comprises a host validator to: generate a fourth authentication tag based on the encrypted data item in response to dispatch of the memory-mapped I/O read response; read the third authentication tag from a register of the accelerator device; and determine whether the third authentication tag matches the fourth authentication tag.

Example 11 includes the subject matter of any of Examples 1-10, and wherein the host validator is further to indicate an error in response to a determination that the third authentication tag does not match the fourth authentication tag.

Example 12 includes the subject matter of any of Examples 1-11, and wherein the accelerator validator is further to: drop the memory-mapped I/O read request in response to a determination that the first authentication tag does not match the second authentication tag; and generate a poisoned authentication tag in response to dropping of the memory-mapped I/O read request.

Example 13 includes the subject matter of any of Examples 1-12, and wherein the accelerator validator is further to dispatch a memory-mapped I/O read response with a poisoned data item to the trusted execution environment in response to the dropping of the memory-mapped I/O read request.

Example 14 includes the subject matter of any of Examples 1-13, and wherein the accelerator device comprises a field-programmable gate array (FPGA).

Example 15 includes the subject matter of any of Examples 1-14, and wherein the trusted execution environment comprises a secure enclave established with secure enclave support of a processor of the computing device.

Example 16 includes a computing device for secure data transfer, the computing device comprising a trusted execution environment and an accelerator device, wherein the accelerator device comprises: an authentication tag controller to initialize an authentication tag in response to an initialization command from the trusted execution environment; a direct memory access engine to transfer data between a host memory buffer and an accelerator device buffer in response to a descriptor from the trusted execution environment, wherein the descriptor is indicative of the host memory buffer, the accelerator device buffer, and a transfer direction; and an accelerator cryptographic engine to (i) perform a cryptographic operation with the data in response to a transfer of the data and (ii) update the authentication tag in response to the transfer of the data; wherein the authentication tag controller is further to finalize the authentication tag in response to a finalization command from the trusted execution environment.

Example 17 includes the subject matter of Example 16, and wherein: the transfer direction comprises host device to accelerator device; to perform the cryptographic operation comprises to decrypt encrypted data to generate plaintext data; and to transfer the data between the host memory buffer and the accelerator device buffer comprises to (i) copy the encrypted data from the host memory buffer and (ii) forward the plaintext data to the accelerator device buffer in response to decryption of the encrypted data.

Example 18 includes the subject matter of any of Examples 16 and 17, and wherein: the transfer direction comprises accelerator device to host device; to perform the cryptographic operation comprises to encrypt plaintext data to generate encrypted data; and to transfer the data between the host memory buffer and the accelerator device buffer comprises to (i) copy the plaintext data from the accelerator device buffer and (ii) forward the encrypted data to the host memory buffer in response to encryption of the plaintext data.

Example 19 includes the subject matter of any of Examples 16-18, and wherein the trusted execution environment comprises a direct memory access manager to: (i) securely write the initialization command to the accelerator device to initialize the secure DMA transfer, (ii) securely configure the descriptor, and (iii) securely write the finalization command to the accelerator device to finalize the authentication tag.

Example 20 includes the subject matter of any of Examples 16-19, and wherein each of to securely write the initialization command, to securely configure the descriptor, and to securely write the finalization command comprises to dispatch a memory-mapped I/O write.

Example 21 includes the subject matter of any of Examples 16-20, and wherein the trusted execution environment further comprises a host validator to: determine an expected authentication tag based on the secure DMA transfer; read the authentication tag from the accelerator device in response to a secure write of the finalization command; and determine whether the authentication tag matches the expected authentication tag.

Example 22 includes the subject matter of any of Examples 16-21, and wherein the host validator is further to: indicate success for the secure DMA transfer in response to a determination that the authentication tag matches the expected authentication tag; and indicate failure for the secure DMA transfer in response to a determination that the authentication tag does not match the expected authentication tag.

Example 23 includes the subject matter of any of Examples 16-22, and wherein: the direct memory access manager is further to determine whether to transfer additional data in response to secure configuration of the descriptor; and to securely write the finalization command comprises to securely write the finalization command in response to a determination not to transfer additional data.

Example 24 includes the subject matter of any of Examples 16-23, and wherein the accelerator device comprises a field-programmable gate array (FPGA).

Example 25 includes the subject matter of any of Examples 16-24, and wherein the trusted execution environment comprises a secure enclave established with secure enclave support of a processor of the computing device.

Example 26 includes a method for secure data transfer, the method comprising: generating, by a trusted execution environment of a computing device, a first authentication tag based on a memory-mapped I/O transaction; writing, by the trusted execution environment, the first authentication tag to an authentication tag register of an accelerator device of the computing device; dispatching, by the trusted execution environment, the memory-mapped I/O transaction to the accelerator device in response to writing the first authentication tag; performing, by the accelerator device, a cryptographic operation associated with the memory-mapped I/O transaction in response to dispatching the memory-mapped I/O transaction; generating, by the accelerator device, a second authentication tag based on the memory-mapped I/O transaction in response to dispatching the memory-mapped I/O transaction; determining, by the accelerator device, whether the first authentication tag matches the second authentication tag; and committing, by the accelerator device, the memory-mapped I/O transaction in response to determining that the first authentication tag matches the second authentication tag.

Example 27 includes the subject matter of Example 26, and further comprising dropping, by the accelerator device, the memory-mapped I/O transaction in response to determining that the first authentication tag does not match the second authentication tag.

Example 28 includes the subject matter of any of Examples 26 and 27, and wherein the memory-mapped I/O transaction comprises a memory-mapped I/O write, and wherein: the method further comprises encrypting, by the trusted execution environment, a data item to generate an encrypted data item; generating the first authentication tag comprises generating the first authentication tag in response to encrypting the data item; dispatching the memory-mapped I/O transaction comprises dispatching the memory-mapped I/O write with the encrypted data item; performing the cryptographic operation comprises decrypting the encrypted data item to generate the data item; generating the second authentication tag comprises generating the second authentication tag based on the encrypted data item; and committing the memory-mapped I/O transaction comprises storing the data item in a memory of the accelerator device.

Example 29 includes the subject matter of any of Examples 26-28, and further comprising setting, by the accelerator device, a status register to indicate success in response to storing the data item.

Example 30 includes the subject matter of any of Examples 26-29, and further comprising verifying, by the trusted execution environment, that the memory-mapped I/O write succeeded in response to dispatching the memory-mapped I/O write.

Example 31 includes the subject matter of any of Examples 26-30, and wherein verifying that the memory-mapped I/O write succeeded comprises securely reading a status register of the accelerator device.

Example 32 includes the subject matter of any of Examples 26-31, and wherein verifying that the memory-mapped I/O write succeeded comprises securely reading a value at an address of the memory-mapped I/O write from the accelerator device.

Example 33 includes the subject matter of any of Examples 26-32, and wherein verifying that the memory-mapped I/O write succeeded comprises securely reading a second authentication tag register of the accelerator device.

Example 34 includes the subject matter of any of Examples 26-33, and wherein the memory-mapped I/O transaction comprises a memory-mapped I/O read request, and wherein: generating the first authentication tag comprises generating the first authentication tag based on an address associated with the memory-mapped I/O read request; committing the memory-mapped I/O transaction comprises reading a data item at the address in a memory of the accelerator device in response to determining that the first authentication tag matches the second authentication tag; and performing the cryptographic operation further comprises encrypting the data item to generate an encrypted data item in response to reading the data item.

Example 35 includes the subject matter of any of Examples 26-34, and further comprising: generating, by the accelerator device, a third authentication tag based on the encrypted data item in response to encrypting the data item; dispatching, by the accelerator device, a memory-mapped I/O read response with the encrypted data item to the trusted execution environment in response to generating the third authentication tag; generating, by the trusted execution environment, a fourth authentication tag based on the encrypted data item in response to dispatching the memory-mapped I/O read response; reading, by the trusted execution environment, the third authentication tag from a register of the accelerator device; and determining, by the trusted execution environment, whether the third authentication tag matches the fourth authentication tag.

Example 36 includes the subject matter of any of Examples 26-35, and further comprising indicating, by the trusted execution environment, an error in response to determining that the third authentication tag does not match the fourth authentication tag.

Example 37 includes the subject matter of any of Examples 26-36, and further comprising: dropping, by the accelerator device, the memory-mapped I/O read request in response to determining that the first authentication tag does not match the second authentication tag; and generating, by the accelerator device, a poisoned authentication tag in response to dropping the memory-mapped I/O read request.

Example 38 includes the subject matter of any of Examples 26-37, and further comprising dispatching, by the accelerator device, a memory-mapped I/O read response with a poisoned data item to the trusted execution environment in response to dropping the memory-mapped I/O read request.

Example 39 includes the subject matter of any of Examples 26-39, and wherein the accelerator device comprises a field-programmable gate array (FPGA).

Example 40 includes the subject matter of any of Examples 26-40, and wherein the trusted execution environment comprises a secure enclave established with secure enclave support of a processor of the computing device.

Example 41 includes a method for secure data transfer, the method comprising: initializing, by an accelerator device of a computing device, an authentication tag in response to an initialization command from a trusted execution environment of the computing device; transferring, by the accelerator device, data between a host memory buffer and an accelerator device buffer in response to a descriptor from the trusted execution environment, wherein the descriptor is indicative of the host memory buffer, the accelerator device buffer, and a transfer direction; performing, by the accelerator device, a cryptographic operation with the data in response to transferring the data; updating, by the accelerator device, the authentication tag in response to transferring the data; and finalizing, by the accelerator device, the authentication tag in response to a finalization command from the trusted execution environment.

Example 42 includes the subject matter of Example 41, and wherein: the transfer direction comprises host device to accelerator device; performing the cryptographic operation comprises decrypting encrypted data to generate plaintext data; and transferring the data between the host memory buffer and the accelerator device buffer comprises (i) copying the encrypted data from the host memory buffer and (ii) forwarding the plaintext data to the accelerator device buffer in response to decrypting the encrypted data.

Example 43 includes the subject matter of any of Examples 41 and 42, and wherein: the transfer direction comprises accelerator device to host device; performing the cryptographic operation comprises encrypting plaintext data to generate encrypted data; and transferring the data between the host memory buffer and the accelerator device buffer comprises (i) copying the plaintext data from the accelerator device buffer and (ii) forwarding the encrypted data to the host memory buffer in response to encrypting the plaintext data.

Example 44 includes the subject matter of any of Examples 41-43, and further comprising: securely writing, by the trusted execution environment, the initialization command to the accelerator device to initialize the secure DMA transfer; securely configuring, by the trusted execution environment, the descriptor; and securely writing, by the trusted execution environment, the finalization command to the accelerator device to finalize the authentication tag.

Example 45 includes the subject matter of any of Examples 41-44, and wherein each of securely writing the initialization command, securely configuring the descriptor, and securely writing the finalization command comprises dispatching a memory-mapped I/O write.

Example 46 includes the subject matter of any of Examples 41-45, and further comprising: determining, by the trusted execution environment, an expected authentication tag based on the secure DMA transfer; reading, by the trusted execution environment, the authentication tag from the accelerator device in response to securely writing the finalization command; and determining, by the trusted execution environment, whether the authentication tag matches the expected authentication tag.

Example 47 includes the subject matter of any of Examples 41-46, and further comprising: indicating, by the trusted execution environment, success for the secure DMA transfer in response to determining that the authentication tag matches the expected authentication tag; and indicating, by the trusted execution environment, failure for the secure DMA transfer in response to determining that the authentication tag does not match the expected authentication tag.

Example 48 includes the subject matter of any of Examples 41-47, and further comprising: determining, by the trusted execution environment, whether to transfer additional data in response to securely configuring the descriptor; wherein securely writing the finalization command comprises securely writing the finalization command in response to determining not to transfer additional data.

Example 49 includes the subject matter of any of Examples 41-48, and wherein the accelerator device comprises a field-programmable gate array (FPGA).

Example 50 includes the subject matter of any of Examples 41-49, and wherein the trusted execution environment comprises a secure enclave established with secure enclave support of a processor of the computing device.

Example 51 includes a computing device comprising: a processor; and a memory having stored therein a plurality of instructions that when executed by the processor cause the computing device to perform the method of any of Examples 26-50.

Example 52 includes one or more non-transitory, computer readable storage media comprising a plurality of instructions stored thereon that in response to being executed result in a computing device performing the method of any of Examples 26-50.

Example 53 includes a computing device comprising means for performing the method of any of Examples 26-50.

The invention claimed is:

1. A computing device for secure data transfer, the computing device comprising:
a host processor to execute program code to implement a trusted execution environment; and
an accelerator device comprising:
an accelerator functional circuit to perform an acceleration task on behalf of the host processor;
an accelerator cryptographic circuit to:
receive a data transaction initiated by the host processor, the data transaction including encrypted data;
receive a first authentication tag generated by the host processor based on the encrypted data; and
generate a second authentication tag based on the encrypted data using a key securely provisioned to both the accelerator cryptographic circuit and the host processor in accordance with a cryptographic algorithm; and
validation circuitry to determine whether the first authentication tag matches the second authentication tag, the validation circuitry to indicate a failure in response to a determination that the first authentication tag does not match the second authentication tag.

2. The computing device of claim 1, wherein the data transaction comprises a transfer of the encrypted data from a buffer of the host processor to a memory of the accelerator device; and wherein the accelerator cryptographic circuit is to decrypt the encrypted data to generate plaintext data.

3. The computing device of claim 2, wherein the accelerator cryptographic circuit is to use the key to decrypt the encrypted data.

4. The computing device of claim 1, wherein the trusted execution environment comprises a direct memory access manager to: securely write an initialization command to the accelerator device to initialize the data transaction, the accelerator device to access the encrypted data with a secure DMA transfer operation.

5. The computing device of claim 4, wherein to securely write the initialization command comprises to dispatch a memory-mapped I/O write.

6. The computing device of claim 1, wherein the data transaction comprises a first data transaction and the encrypted data includes first encrypted data, wherein the trusted execution environment further comprises a host validation circuit to:
receive a second data transaction initiated by the accelerator device, the second data transaction including second encrypted data;
receive a third authentication tag generated by the accelerator cryptographic circuit based on the second encrypted data;
generate a fourth authentication tag based on the encrypted data using a key securely provisioned to both the accelerator cryptographic circuit and the host processor in accordance with a cryptographic algorithm;
determine whether the fourth authentication tag matches the third authentication tag; and
indicate a failure in response to a determination that the fourth authentication tag does not match the third authentication tag.

7. The computing device of claim 6, wherein the host validation circuit is to decrypt the second encrypted data in response to a determination that the fourth authentication tag matches the third authentication tag.

8. One or more non-transitory computer-readable storage media comprising a plurality of instructions stored thereon that, in response to being executed, cause a computing device to perform operations comprising:
executing program code by a host processor to implement a trusted execution environment;
performing, by an accelerator functional circuit of an accelerator device an acceleration task on behalf of the host processor;
receiving, by cryptographic circuitry of the accelerator device, a data transaction initiated by the host processor including encrypted data and a first authentication tag generated based on the encrypted data;
generating, by the cryptographic circuitry, a second authentication tag based on the encrypted data using a key securely provisioned to both the cryptographic circuitry and the host processor in accordance with a cryptographic algorithm;
determining whether the first authentication tag matches the second authentication tag; and
indicating a failure in response to a determination that the first authentication tag does not match the second authentication tag.

9. The one or more non-transitory computer-readable storage media of claim 8, wherein the operations further comprise:
performing a cryptographic operation comprising decrypting the encrypted data using the key to generate plaintext data.

10. The one or more non-transitory computer-readable storage media of claim 9, wherein:
encrypting by the host processor, the plaintext data using the key to generate the encrypted data; and
transferring the encrypted data from a host memory buffer to an accelerator device buffer.

11. The one or more non-transitory computer-readable storage media of claim 8, wherein the operations further comprise:
securely writing, by the trusted execution environment, an initialization command to the accelerator device to initialize a secure direct memory access (DMA) transfer of the encrypted data.

12. The one or more non-transitory computer-readable storage media of claim 11, wherein the data transaction comprises a first data transaction and the encrypted data includes first encrypted data, wherein the operations further comprise:
receiving, by the trusted execution environment, a second data transaction initiated by the accelerator device, the second data transaction including second encrypted data;
receiving, by the trusted execution environment, a third authentication tag generated by the accelerator device based on the second encrypted data;
generating a fourth authentication tag based on the encrypted data using a key securely provisioned to both the accelerator device and the trusted execution environment in accordance with a cryptographic algorithm;
determining, by the trusted execution environment, whether the fourth authentication tag matches the third authentication tag; and
indicating a failure in response to a determination that the fourth authentication tag does not match the third authentication tag.

13. A method comprising:
executing program code by a host processor to implement a trusted execution environment;
performing, by an accelerator functional circuit of an accelerator device an acceleration task on behalf of the host processor;
receiving, by cryptographic circuitry of the accelerator device, a data transaction initiated by the host processor including encrypted data and a first authentication tag generated based on the encrypted data;
generating, by the cryptographic circuitry, a second authentication tag based on the encrypted data using a key securely provisioned to both the cryptographic circuitry and the host processor in accordance with a cryptographic algorithm;
determining whether the first authentication tag matches the second authentication tag; and
indicating a failure in response to a determination that the first authentication tag does not match the second authentication tag.

14. The method of claim 13, further comprising:
performing a cryptographic operation comprising decrypting the encrypted data using the key to generate plaintext data.

15. The method of claim 14, further comprising:
encrypting by the host processor, the plaintext data using the key to generate the encrypted data; and
transferring the encrypted data from a host memory buffer to an accelerator device buffer.

16. The method of claim 13, further comprising:
securely writing, by the trusted execution environment, an initialization command to the accelerator device to initialize a secure direct memory access (DMA) transfer of the encrypted data.

17. The method of claim 16, wherein the data transaction comprises a first data transaction and the encrypted data includes first encrypted data, the method further comprising:

receiving, by the trusted execution environment, a second data transaction initiated by the accelerator device, the second data transaction including second encrypted data;

receiving, by the trusted execution environment, a third authentication tag generated by the accelerator device based on the second encrypted data;

generating a fourth authentication tag based on the encrypted data using a key securely provisioned to both the accelerator device and the trusted execution environment in accordance with a cryptographic algorithm; and determining, by the trusted execution environment, whether the fourth authentication tag matches the third authentication tag; and indicating a failure in response to a determination that the fourth authentication tag does not match the third authentication tag.

\* \* \* \* \*